US012743011B2

(12) United States Patent
Sasaki et al.

(10) Patent No.: US 12,743,011 B2
(45) Date of Patent: Sep. 22, 2026

(54) ILLUMINATION DEVICE AND PROJECTOR

(71) Applicants: Takashi Sasaki, Kanagawa (JP); Yohei Takano, Kanagawa (JP); Kazuhiro Fujita, Tokyo (JP); Kasumi Nakamura, Kanagawa (JP)

(72) Inventors: Takashi Sasaki, Kanagawa (JP); Yohei Takano, Kanagawa (JP); Kazuhiro Fujita, Tokyo (JP); Kasumi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 646 days.

(21) Appl. No.: 18/107,522

(22) Filed: Feb. 9, 2023

(65) Prior Publication Data

US 2023/0259012 A1 Aug. 17, 2023

(30) Foreign Application Priority Data

Feb. 16, 2022 (JP) ................................ 2022-022257
May 30, 2022 (JP) ................................ 2022-087937
Jun. 23, 2022 (JP) ................................ 2022-100994

(51) Int. Cl.
*G03B 21/20* (2006.01)
*G03B 33/08* (2006.01)

(52) U.S. Cl.
CPC ..... *G03B 21/2013* (2013.01); *G03B 21/2066* (2013.01); *G03B 21/208* (2013.01); *G03B 33/08* (2013.01)

(58) Field of Classification Search
None
See application file for complete search history.

(56) References Cited

U.S. PATENT DOCUMENTS

2012/0224151 A1* 9/2012 Dassanayake ..... G02B 27/1053 353/33
2015/0341605 A1* 11/2015 Yamada ................. G02B 27/30 353/30

(Continued)

FOREIGN PATENT DOCUMENTS

CN 208834078 U 5/2019
JP H05-72628 A 3/1993

(Continued)

OTHER PUBLICATIONS

Office Action issued on Nov. 29, 2025, in corresponding Chinese patent Application No. 202310091479.3, 20 pages.

(Continued)

*Primary Examiner* — Toan Ton
*Assistant Examiner* — Danell L Owens
(74) *Attorney, Agent, or Firm* — XSENSUS LLP

(57) ABSTRACT

An illumination device includes: a first light source to emit a first light beam having a first intensity distribution in a first direction; a second light source to emit a second light beam having a second intensity distribution in a second direction different from the first direction; a light combiner to combine the first light beam and the second light beam; and a light homogenizer to homogenize the first intensity distribution and the second intensity distribution to generate a third light beam. The light combiner is a polygonal prism including: a reflection surface to generate a reflection light beam; and multiple transmission surfaces to generate a transmission light beam. The light homogenizer homogenizes the reflection light beam and the transmission light beam and emits the third light beam. The first light beam and the second light beam propagate in different optical paths in the light combiner.

19 Claims, 12 Drawing Sheets

(56) References Cited

U.S. PATENT DOCUMENTS

| | | | | |
|---|---|---|---|---|
| 2017/0307969 | A1* | 10/2017 | Kawasumi | G03B 21/2073 |
| 2018/0017219 | A1* | 1/2018 | Hikmet | G02B 27/1006 |
| 2018/0074302 | A1 | 3/2018 | Takano et al. | |
| 2019/0170988 | A1 | 6/2019 | Takano et al. | |
| 2019/0219801 | A1 | 7/2019 | Takano et al. | |
| 2019/0285979 | A1 | 9/2019 | Takano et al. | |
| 2020/0064719 | A1 | 2/2020 | Nakamura et al. | |
| 2020/0201008 | A1 | 6/2020 | Takano et al. | |
| 2020/0201154 | A1* | 6/2020 | Sugiyama | G03B 21/204 |
| 2020/0230886 | A1 | 7/2020 | Takano et al. | |
| 2020/0301260 | A1 | 9/2020 | Takano et al. | |
| 2020/0301266 | A1 | 9/2020 | Nakamura et al. | |
| 2021/0136336 | A1 | 5/2021 | Takano et al. | |
| 2021/0173290 | A1 | 6/2021 | Takano et al. | |
| 2021/0200075 | A1 | 7/2021 | Nakamura et al. | |
| 2021/0389652 | A1 | 12/2021 | Takano et al. | |
| 2022/0066177 | A1 | 3/2022 | Takano et al. | |
| 2022/0171267 | A1 | 6/2022 | Takano et al. | |
| 2022/0171268 | A1 | 6/2022 | Hirakawa et al. | |
| 2022/0179298 | A1 | 6/2022 | Fujita et al. | |
| 2022/0299852 | A1 | 9/2022 | Nakamura et al. | |
| 2022/0342291 | A1 | 10/2022 | Fujita et al. | |
| 2022/0345671 | A1* | 10/2022 | Sasaki | G03B 21/204 |

FOREIGN PATENT DOCUMENTS

| | | | |
|---|---|---|---|
| JP | 2006308777 | A | 11/2006 |
| JP | 2014-160233 | | 9/2014 |
| JP | 2015-132665 | A | 7/2015 |
| JP | 2017227809 | A | 12/2017 |
| JP | 2020-154144 | | 9/2020 |
| WO | WO2010/146683 | A1 | 12/2010 |
| WO | 2021115493 | A2 | 6/2021 |

OTHER PUBLICATIONS

Office Action issued Mar. 17, 2026 in corresponding Japanese Patent Application No. 2022-100994.

* cited by examiner

L
1D
LIGHT SOURCE LS1
3
17 16 15 18
53
F1
2
2A
19
14
F2
13
18
12
11
15
LIGHT SOURCE LS2
16
19 14 13 12 11
17

1E
LIGHT SOURCE LS1
LIGHT SOURCE LS2
PLANE A
PLANE B
17
A2
15
A1
16
12
11
13
18
16,18
2
15
53
B2
19
14
B1
13
12
11
Z
Y
X

ILLUMINATION DEVICE AND PROJECTOR

CROSS-REFERENCE TO RELATED APPLICATIONS

This patent application is based on and claims priority pursuant to 35 U.S.C. § 119(a) to Japanese Patent Application No. 2022-022257, filed on Feb. 16, 2022, Japanese Patent Application No. 2022-087937, filed on May 30, 2022, and Japanese Patent Application No. 2022-100994, filed on Jun. 23, 2022, in the Japan Patent Office, the entire disclosures of which are hereby incorporated by reference herein.

BACKGROUND

Technical Field

Embodiments of this disclosure relate to an illumination device and a projector.

Related Art

In a typical illumination device for a projector, the technology to provide a smaller and higher-luminance illumination device in which light beams emitted from two light sources are combined is disclosed.

SUMMARY

An illumination device includes: a first light source to emit a first light beam having a first intensity distribution in a first direction; a second light source to emit a second light beam having a second intensity distribution in a second direction different from the first direction; a light combiner to combine the first light beam emitted from the first light source and the second light beam emitted from the second light source; and a light homogenizer, which is separate from the light combiner, to homogenize the first intensity distribution of the first light beam and the second intensity distribution of the second light beam to generate and emit a third light beam. The light combiner is a polygonal prism including: a reflection surface to reflect the first light beam to the light homogenizer in the second direction to generate a reflection light beam; and multiple transmission surfaces having opposite surfaces to transmit the second light beam to the light homogenizer in the second direction to generate a transmission light beam, the light homogenizer homogenizes the reflection light beam and the transmission light beam and emits the third light beam; and the first light beam incident on the reflection surface and the second light beam incident on the transmission surfaces propagate in different optical paths in the light combiner.

Further, an embodiment of the present disclosure provides an illumination device including: a first light source to emit a first light beam having a first intensity distribution in a first direction; a second light source to emit a second light beam having a second intensity distribution in a second direction different from the first direction; a light combiner to combine the first light beam emitted from the first light source and the second light beam emitted from the second light source; and a light homogenizer separated from the light combiner and to homogenize the first intensity distribution of the first light beam and the second intensity distribution of the second light beam to generate and emit a third light beam. The first light beam is reflected by the light combiner and is incident on the light homogenizer in the second direction; and the second light beam is incident on the light homogenizer in the second direction without passing through the light combiner.

Further, an embodiment of the present disclosure provides a projector including: the illumination device described above; and a projection lens.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
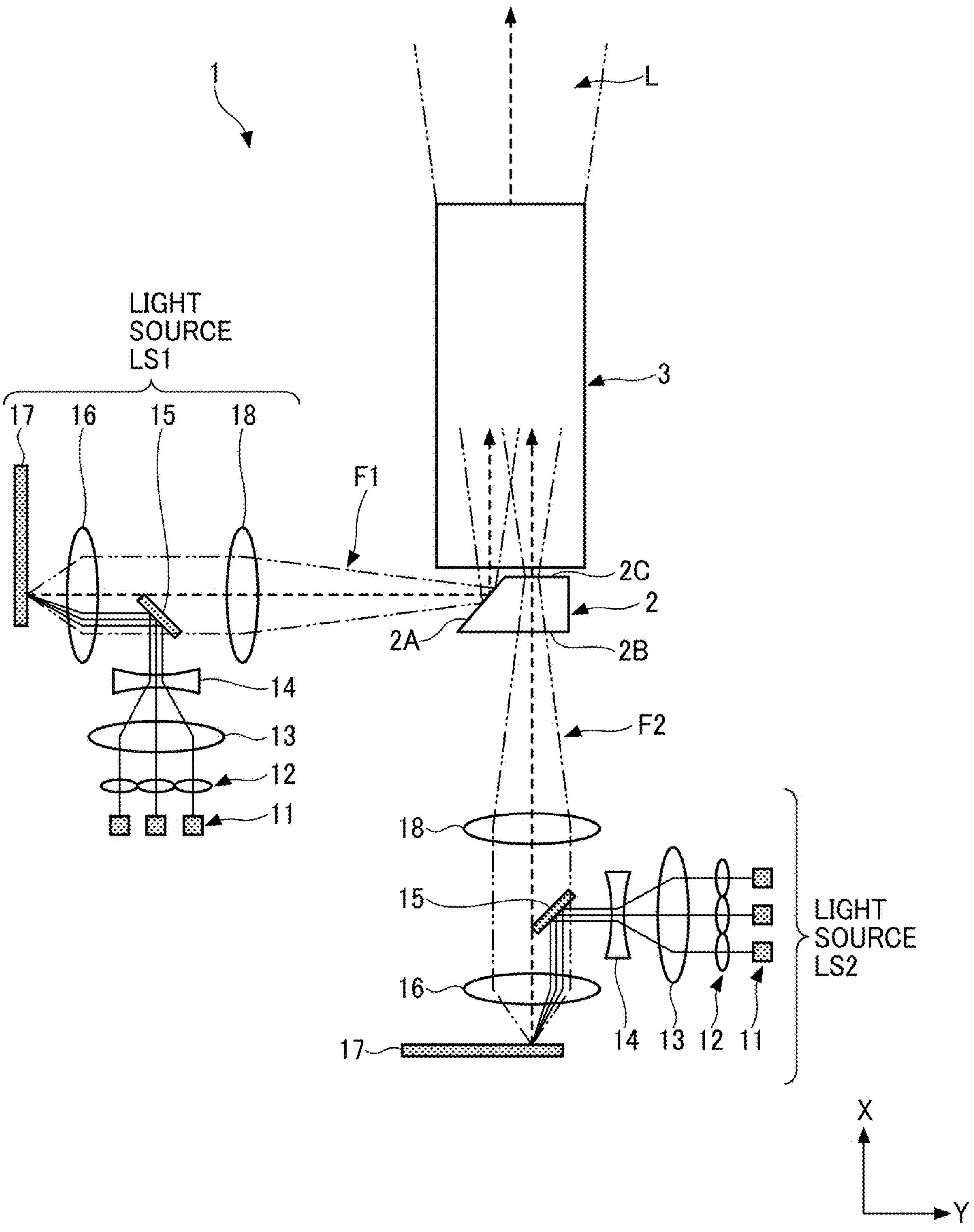
FIG. 1 is a diagram of an illumination device including two light sources according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to the embodiments of the present invention, the size of the illumination device for the projector is reduced and the efficiency is increased.

Embodiments will be described below with reference to the accompanying drawings. In order to facilitate understanding of the description, the same reference numerals are assigned to the same constituent elements as much as possible in each of the drawings, and duplicate description is omitted.

In the following description, the X-direction and the Y-direction are perpendicular to each other. The X-direction and Y-direction are typically the horizontal directions in the three-dimensional space. Herein, in the X-direction, the light beam enters a light homogenizer 3 (in an incident direction or incoming direction) and exits from the light homogenizer 3 (in an exit direction or outgoing direction). An optical axis of the light beam F1 emitted from the light source LS1 is parallel to the Y-direction.

FIG. 1 is a diagram of an illumination device including two light sources according to an embodiment. The illumination device 1 is an element incorporated in the projector 50 (see FIG. 4) and used as a light source of the projector 50. Herein, the "projector" according to the present embodiment is a kind of a display apparatus to display an image or a video on a large screen by projecting the image or the video onto the screen. In the projector, a digital micromirror device (DMD) or a liquid crystal display is used for projecting and magnifying the image. The projector may also be referred to as a projection device.

An illuminating device 1 includes two light sources LS1 and LS2, a light combiner 2, and a light homogenizer 3.

In the two light sources, the light source LS1 emits the light beam F1 (fluorescent light) and the light source LS2 emits the light beam F2 (i.e., fluorescent light). The optical axis of the light beam F1 emitted from the light source LS1 and the optical axis of the light beam F2 emitted from the light source LS2 are different in the direction. In the configuration in FIG. 1, the optical axis of the light source LS1 and the optical axis of the light source LS2 are arranged to be orthogonal to each other. Further, the light source LS1 and the light source LS2 are arranged so that the light beam F1 emitted from the light source LS1 and the light beam F2 emitted from the light source LS2 enter the light combiner 2. The light combiner 2 is common to the light beams F1 and F2.

The light source LS1 includes a light emitting element 11, optical elements 12, 13, 14, 16 and 18, a reflective optical element 15, and a wavelength converter 17.

In the illumination device, at least one of the first light source or the second light source includes multiple optical elements.

The light emitting element 11 is a light source to emit blue light beam such as a laser diode (LD) or a light emitting diode (LED). In FIG. 1, three light emitting elements 11 are arranged. However, a single light emitting element 11 may be used, or the light emitting elements may be arrayed in one dimension or two dimensions.

The optical element 12 collimates the light beam emitted from the light emitting element 11. The optical element 12 may be formed integrally with or separately from the light emitting element 11. The reflective optical element 15 is simply a mirror and may also be a dichroic mirror having wavelength characteristics, or a diffractive optical element referred to as a diffractive optical element (DOE).

The optical element 12, the optical element 13, the optical element 14, and the reflective optical element 15 are arranged in this order along the optical axis (i.e., the positive X-direction in FIG. 1) of the light beam emitted from the light emitting element 11. The wavelength converter 17, the optical element 16, the reflective optical element 15, and the optical element 18 are arranged in this order along the optical axis of the light beam F1 (i.e., the negative Y-direction in FIG. 1).

The optical elements 13 and 14, the reflective optical element 15, and the optical element 16 constitute a condensing optical system. The condensing optical system forms a light spot on the wavelength converter 17.

The wavelength converter 17 converts the blue light condensed on the light spot into yellow or yellow-green fluorescent light using a fluorescent material, and emits the fluorescent light beam to the negative Y-direction. Thus, the light emitting element 11 is an excitation light source to emit the excitation light to be incident on the wavelength converter 17. The light source LS1 emits the light beam F1 (i.e., fluorescent light) having the wavelength converted by the wavelength converter 17.

As described above, the wavelength converter 17, the optical element 16, and the optical element 18 are arranged in this order along the optical axis of the fluorescent light emitted from the wavelength converter 17 (along the positive Y-direction in FIG. 1). According to the configuration, the light beam F1 (i.e., fluorescent light) emitted from the wavelength converter 17 is guided to the light combiner 2 through the relay lens system including the optical element 16 and the optical element 18.

In FIG. 1, since the configuration of the light source LS2 is the same as that of the light source LS1, the description thereof is omitted. The light source LS2 also converts the blue light emitted from the light emitting element 11 into yellow or yellow-green fluorescent light (i.e., the light beam F2) by the wavelength converter 17, and emits the fluorescent light to the light combiner 2.

As described above, the light source LS1 and the light source LS2 illustrated in FIG. 1 include an excitation light source (i.e., light emitting element 11) and a wavelength converter 17. Thus, the illumination device 1 with higher luminance is provided.

In the illumination device, at least one of the first light source or the second light source includes an excitation light source and a wavelength converter.

The light combiner 2 is an element to combine the light beam F1 of the light source LS1 and the light beam F2 of the light source LS2. In the present embodiment, the light combiner 2 is, for example, a prism having four or more surfaces (i.e., multiple surfaces). One of the multiple surfaces of the prism is a reflection surface 2A, and two opposing surfaces are transmission surfaces 2B and 2C.

The light combiner 2 reflects the light beam F1 emitted from the light source LS1 and transmits the light beam F2 emitted from the light source LS2 to combine the light beam F1 and the light beam F2 together (i.e., form a combined light beam) and guides the combined light beam to the light homogenizer 3. Accordingly, the illumination device in which the light beam F1 emitted from LS1 and the light beam F2 emitted from LS2 are combined is provided.

At least one of the transmission surfaces 2B and 2C of the prism (i.e., light combiner 2) may be a diffusion surface, and a separate diffusion plate may be provided at each of the front and rear of the prism. According to the configuration, unevenness of color and luminance caused by the light beam F2 emitted from the light source LS2 is eliminated.

In the illumination device, at least one of an incident surface or an exit surface of the polygonal prism is a diffuse surface.

When the light beam F1 and the light beam F2 combined by the light combiner 2 enter the light homogenizer 3, the light homogenizer 3 emits light beam L in which the illuminance and intensity distribution of the light beam F1 and the light beam F2 are homogenized. In the present embodiment, the light homogenizer 3 is a light tunnel in which four mirrors are bonded together. Since the light tunnel, which is relatively inexpensive, is used for the light homogenizer 3, the cost of the illumination device 1 is reduced. A rod integrator, which is a rod-shaped glass or a glass prism, may be applied to the light homogenizer 3. Since the rod integrator uses the total internal reflection (TIR) and the light use efficiency is higher, an illumination device achieves a higher efficiency and higher-output power. Further, other elements such as multiple fly-eye lenses may be applied to the light homogenizer 3.

In the illumination device according to an embodiment, the light homogenizer includes a rod integrator.

In the illumination device according to another embodiment, the light homogenizer includes a light tunnel.

When the rod integrator is used as the light homogenizer 3, the emitted light beam L has higher efficiency and higher output than the case of the light tunnel. However, since the rod integrator uses the total internal reflection to homogenize the light beam in the rod integrator, the range of the incident angle at which the light beam enters the light homogenizer 3 is restricted. The range of the incident angle is within a condition to satisfy the TIR condition. Thus, the arrangement of the light sources LS1 and LS2 also depends on the light homogenizer 3 to satisfy the TIR condition.

By contrast, when the light tunnel is used as the light homogenizer 3, the light tunnel does not use the TIR. Since the reflection surface 2A and the transmission surfaces 2B and 2C combine the light beam F1 and the light beam F2, there is no restriction on the TIR condition. As a result, a latitude of the arrangement of the light sources LS1 and LS2 with respect to the light homogenizer 3 is increased, and the size of the illumination device is reduced.

In the present embodiment, the light combiner 2 (e.g., prism) is separate from the light homogenizer 3. In a typical technique, a rod integrator, which is relatively expensive, is applied to the light homogenizer 3, and an optical element corresponding to the light combiner 2 is integrated with the rod integrator, so that it is difficult to apply other elements such as a relatively inexpensive light tunnel to the light homogenizer. By contrast, in the present embodiment, since the light combiner 2 is separate from the light homogenizer 3, a relatively lower-cost element other than the rod integrator is easily applied to the light homogenizer 3, so that the latitude of a device design is increased and the cost of the device is reduced.

Further, in the present embodiment, the light source LS1 emits the light beam F1 and the light source LS2 emits the light beam F2. The light beam F1 enters the light homogenizer 3 as reflection light beam and the light beam F2 enters the light homogenizer as transmission light beam. Thus, the angle between the optical axes of the light beam F1 and the light beam F2 is at least less than 180 degrees, and preferably 90 degrees. In a typical illumination device, for example, two light sources are oppositely arranged along a line and two reflection light beam emitted from the two light sources enter a light homogenizer. There is a certain distance between the two light sources. By contrast, in the present embodiment, the distance between the light source LS1 and the light source LS2 becomes closer than the distance in the typical illumination device. Thus, the space (area) in which the illumination device 1 occupies is reduced, and the size of the device is reduced.

In the present embodiment, the light combiner 2 is, for example, a prism including four surfaces. Among the four surfaces, one surface is a reflection surface 2A to generate the reflection light, and two surfaces, which are opposite to each other, are the transmission surfaces 2B and 2C to generate transmitted light. When the light beam F1 emitted from the light source LS1 enters the reflection surface 2A and the light beam F2 emitted from the light source LS2 transmits the transmission surfaces 2B and 2B, the light beam F1 and the light beam F2 propagate in different optical path. Thus, the light beam F1 and the light beam F2 are combined without loss and enter the light homogenizer 3, so that the efficiency of the emitted light L is increased. Thus, in the present embodiment, the size is reduced and the efficiency is increased in the illumination device 1 for the projector.

Figure 3:
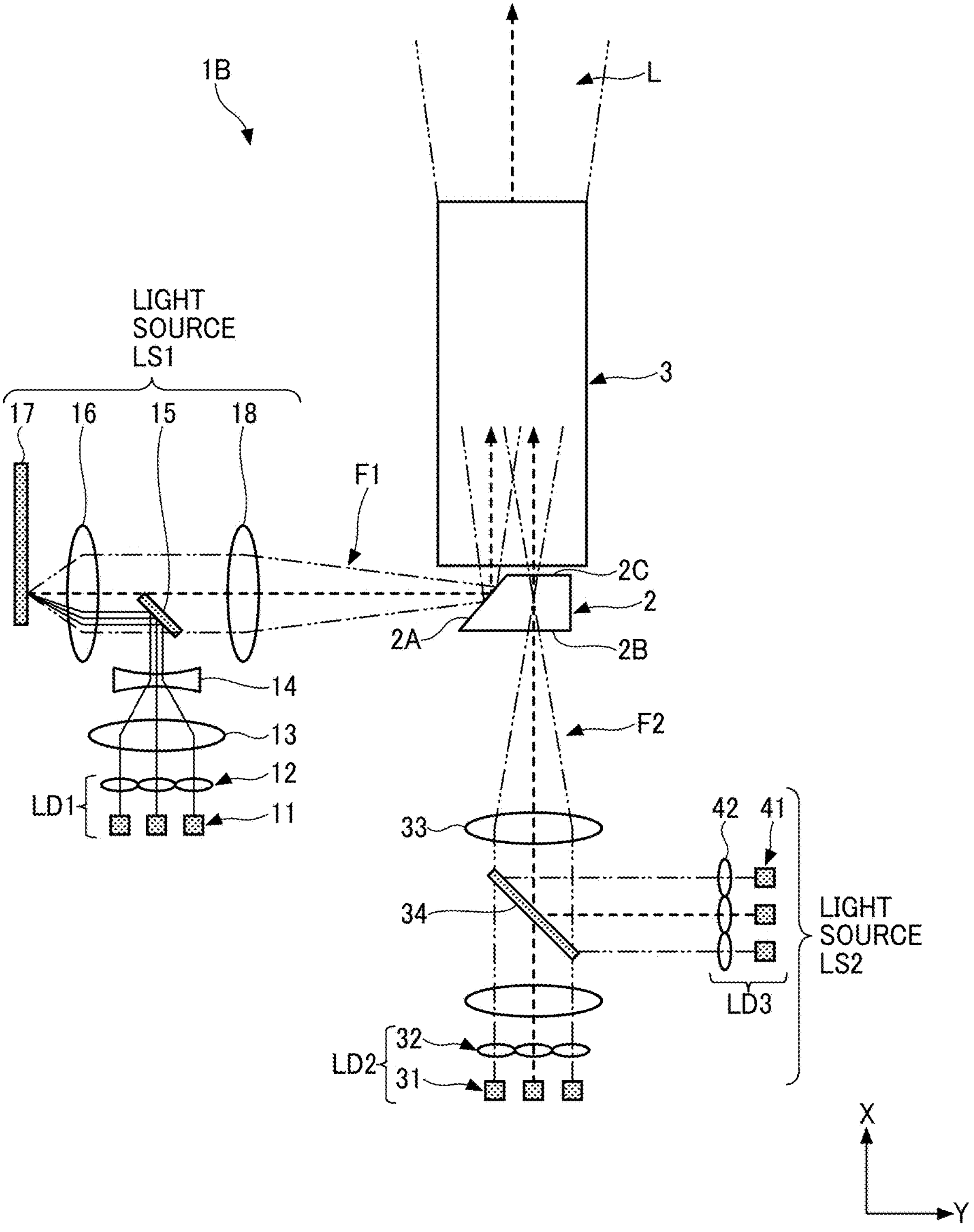
FIG. 3 is a diagram of an illumination device including two light sources having still another configuration as a second example.

In the present embodiment, the light source LS1 and the light source LS2 are used. The light source LS1 is disposed at a position at which the angle of the optical axis of the light beam F1 with respect to the incident direction to the light homogenizer 3 is 90 degrees. The angle is also 90 degrees with respect to the emitting direction of the light beam L emitted from the light homogenizer 3 (FIG. 3). Further, the light source LS1 and the light source LS2 are arranged so that the angle between the optical axes of the light beam F1 emitted from the light source LS1 and the light beam F2 emitted from the LS2 become 90 degrees.

In the illumination device, a first optical axis of the first light beam emitted from the first light source is arranged at 90 degrees with respect to a second optical axis of the second light beam incident on the light homogenizer.

According to the configuration described above, the light source LS2 is arranged at a position before the light homogenizer 3 along the light incident direction (i.e., negative X-direction), and the light source LS1 is arranged at the right-angle with respect to the light incident direction (i.e., negative Y-direction). In a typical illumination device, for example, two light sources are oppositely arranged along a line and two reflection light emitted from the two light sources enter a light homogenizer. There is a certain distance between the two light sources. By contrast, in the present embodiment, the distance between the light source LS1 and the light source LS2 becomes definitely closer than the distance in the typical illumination device. Thus, the area in which the illumination device 1 occupies is reduced, and the size of the illumination device 1 is further reduced.

Herein, the angle of "90 degrees" includes a predetermined range including an angle of 90 degrees (e.g., a range from several degree lower than 90 degrees to several degree higher than 90 degrees). In the case of the angle of 90 degrees, the spread angle of the light can be maintained. In the present embodiment, "90 degrees" includes an angle range in which characteristics equivalent to those in the case of 90 degrees is achieved, in other words, the angle of 90 degrees has a tolerance. Herein, the tolerance is several degrees, and the optical performance of the illumination device is equivalent to or hard to change within the tolerance.

In the present embodiment, the light beam F1 emitted from the light source LS1 enters the light homogenizer 3 as reflected light via the light combiner 2 and the light beam F2 emitted from the light source LS2 enters the light homogenizer 3 as transmission light via the light combiner 2, and the angle between the light source LS1 and the light source LS2 may be any angle other than 90 degrees. Similarly, the angle formed by the light emitted from the light source LS1 and enters the light homogenizer 3 as reflection light and the incident direction to the light homogenizer 3 may be other than 90 degrees. As illustrated in FIG. 1, when the angle between the light beam F1 and the light beam F2 is 90 degrees, the design of the prism shape of the light combiner 2 or arrangements of the light sources LS1 and LS2 becomes easier.

An illumination device includes: a first light source to emit a first light beam having a first intensity distribution in a first direction; a second light source to emit a second light beam having a second intensity distribution in a second direction different from the first direction a light combiner to combine the first light beam emitted from the first light source and the second light beam emitted from the second light source; and a light homogenizer, which is separate from the light combiner, to homogenize the first intensity distribution of the first light beam and the second intensity distribution of the second light beam to generate and emit a third light beam. The light combiner is a polygonal prism including: a reflection surface to reflect the first light beam to the light homogenizer in the second direction to generate a reflection light beam; and multiple transmission surfaces having opposite surfaces to transmit the second light beam to the light homogenizer in the second direction to generate a transmission light beam, the light homogenizer homogenizes the reflection light beam and the transmission light beam and emits the third light beam, and the first light beam incident on the reflection surface and the second light beam incident on the transmission surfaces propagate in different optical paths in the light combiner.

Figure 2:
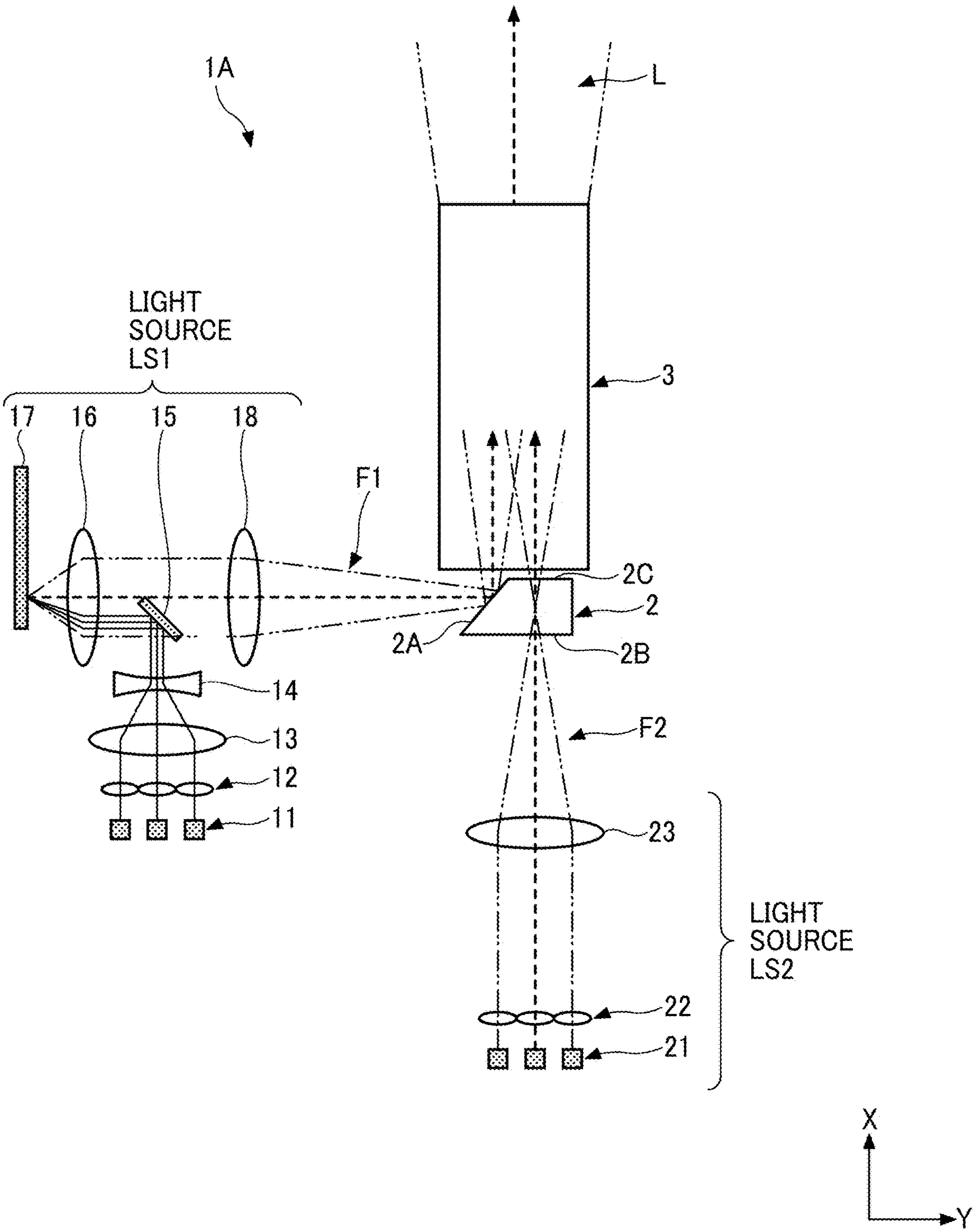
FIG. 2 is a diagram of an illumination device including two light sources having another configuration as a first example.

In FIG. 1, the configurations of the light source LS1 and that of LS2 are identical as an example, but may be different. In FIG. 2, the illumination device including two light sources of different configurations is illustrated as a first example of an illumination device 1A.

In FIG. 2, the configuration of the light source LS1 is the same as that of the light source LS1 in FIG. 1. By contrast, the light source LS2 includes a light emitting element 21, an optical element 22, and an optical element 23. The light emitting element 21 and the optical element 22 have the same configuration as those of the light emitting element 11 and the optical element 12 of the light source LS1. The light emitting element 21 is, for example, an LD or an LED to generate light having a wavelength longer than the wavelength of the light emitted from the light emitting element 11 used for the light source LS1.

The light emitting element 21 is arranged to face the transmission surfaces 2B and 2C of the light combiner 2. The optical axis of the light emitted from the light emitting element 21 is along, or parallel to the positive X-direction. Further, the light emitting element 21, the optical element 22, and the optical element 23 are arranged in this order along the optical axis (positive X-direction in FIG. 2) of the light emitted from the light emitting element 21.

The optical element 23 works as a condensing optical system to guide the light beam emitted from the light emitting element 21 to the light combiner 2.

In the illumination device 1A illustrated in FIG. 2, the wavelength converter 17 is not provided in the light source LS2. The light beam F1 emitted from the light source LS1 is obtained by converting the blue light beam emitted from the light emitting element 11 into yellow or yellow-green fluorescent with the wavelength converter 17. By contrast, the wavelength of the light beam F2 emitted from the light source LS2 is not converted. The light directly emitted from the light emitting element 21 propagates with the wavelength remaining unconverted.

Thus, in the illumination device 1A illustrated in FIG. 2, the spectrum of the light source LS1 (first spectrum) and the spectrum of the light source LS2 (second spectrum), which the first spectrum and the second spectrum are different from each other, are used. The spectrum is a light emission feature of the light source and is expressed by the light intensity with respect to the wavelengths. Herein, since the first spectrum of the light emitted from the light source LS1 and the second spectrum of the light emitted from the light source LS2 are different, the color of the first light and the color of the second light are different from each other. As described above, since the spectra of the light beam F1 and the light beam F2 emitted from the light sources LS1 and LS2, respectively combined by the light combiner 2 are different each other, the illumination device having the higher color reproduction is provided.

In the illumination device according, a first spectra of the first light beam is different from a second spectra of the second light beam combined with the first light beam by the light combiner.

In the illumination device 1A illustrated in FIG. 2, the light source LS1 and the light source LS2 may be interchangeable in the configuration. Contrary to the configuration illustrated in FIG. 2, a configuration may be adopted in which the light source LS1 includes the light emitting element 21 excitation light source) and does not include the wavelength converter 17, and the light source LS2 includes the light emitting element 11 the excitation light source (i.e., the excitation light source) and the wavelength converter 17.

FIG. 3 is a diagram of an illumination device 1B including two light sources having different configuration as a second example. In FIG. 3, the configuration of the light source LS1 is the same as that of the light source LS1 illustrated in FIGS. 1 and 2, and has a single excitation light source LD1 (e.g., light emitting element 11 and optical element 12). By contrast, the light source LS2 has two solid-state light sources LD2 and LD3 in the inside.

The solid light source LD2 includes a light emitting element 31 and an optical element 32. The light source LS2 includes an optical element 33 and a reflective optical element 34. The light emitting element 31, the optical element 32, and the optical element 33 have the same configuration as the light emitting element 21, the optical element 22, and the optical element 23 in FIG. 2, and are arranged in the same manner. The reflective optical element 34 is, for example, a dichroic mirror, and transmits the light beam emitted from the light source LD2 (i.e., solid light source) and reflects the light beam emitted from the light source LD3 (i.e., solid light source).

The light emitting element 31, the optical element 32, the reflective optical element 34, and the optical element 33 are arranged in this order along the optical axis (positive X-direction in FIG. 2) of the light beam emitted from the light emitting element 31.

The solid light source LD3 includes a light emitting element 41 and an optical element 42. The light emitting element 41 is arranged to face one surface of the reflective optical element 34 along the optical axis of the light beam emitted from the light emitting element 41 (negative Y-direction).

The light source LS2 is arranged to have a configuration in which the light beam emitted from the solid light source LD2 transmits the reflective optical element 34, and the light beam emitted from the solid light source LD3 is reflected to the direction to the light combiner 2, and both light beams enter the transmission surface 2B of the light combiner 2.

As illustrated in FIG. 3, in the illumination device 1B, the light source LS2 does not include the wavelength converter 17. The light beam F1 emitted from the light source LS1 is yellow or yellow-green fluorescent light converted from the blue light beam emitted from the light emitting element 11. The light beam F2 emitted from the light source LS2 is not wavelength-converted and remains as the two types of light beam emitted from the light emitting elements 31 and 41.

Thus, also in the illumination device 1B in FIG. 3, since the spectra of the two light sources LS1 and LS2 to be combined are different, an illumination device having a higher color reproducibility is achieved, as in the illumination device 1A illustrated in FIG. 2.

In the illumination device 1B in FIG. 3, since the light source LS2 includes multiple light emitting elements 31 and 41, the spectra of the light beam emitted from the two light emitting elements 31 and 41 are different. Thus, the illumination device 1B in FIG. 3 combines three light beams emitted from three light sources LD1, LD2, and LD3 having different spectra. The number of light beams to be combined is increased in the illumination device 1B as compared with the number of the light beams to be combined in the configuration illustrated in FIGS. 1 and 2.

In the illumination device 1B in FIG. 3, the configurations of the two light sources LS1 and LS2 are interchangeable. In the case where the configurations are interchanged. Contrary to the configuration in FIG. 3, a configuration may be adopted in which the light source LS1 includes two solid light sources LD2 and LD3 and does not include the wavelength converter 17, and the light source LS2 includes the excitation light source LD1 and the wavelength converter 17.

Alternatively, both of the two light sources LS1 and LS2 may include multiple solid state light sources LD2 and LD3 (i.e., light emitting elements 31 and 41).

As illustrated in FIGS. 2 and 3, the configuration in which either the light source LS1 or the light source LS2 includes the excitation light source LD1 (e.g., light emitting element 11) and the wavelength converter 17 provides the illumination device 1 having a higher brightness as of the example in FIG. 1.

In the illumination device 1B illustrated in FIG. 3, for example, the excitation light source LD1 emits blue light beam, the solid state light source LD2 emits red light beam, and the solid state light source LD3 emits green light beam. The colors of the solid light sources LD2 and LD3 may be interchangeable. In such a case, the light source LS1 emits yellow or yellow-green fluorescent light and blue light beam (F-B light beam), and the light source LS2 emits red and green light beam (R-G light beam). The F-B light beam and the R-G light beam enter the light combiner 2 and are guided to the light homogenizer 3 to provide an illumination device having a higher color reproducibility.

When a lower-cost and higher-luminance light source is provided, a configuration in which the light emitting element 11 of the light source LS1 emits blue light beam, and the light emitting element 21 of the light source LS2 emits blue light beam different from the light emitting element 11 in color in the configuration of the illumination device 1A in FIG. 2 is used. For example, the light source to emit the light beam having a wavelength around 455 nm with higher efficiency as an excitation light source of the phosphor (fluorescent material) is used for the light emitting element 11 of the light source LS1, and a light source to emit the light beam having a wavelength around 465 nm with brighter blue color is used. The configurations of the light emitting element 11 of the light source LS1 and the light emitting element 21 of the light source LS2 are interchangeable.

When the light source having a higher-color reproductivity at lower-cost is provided, a configuration in which the light emitting element 11 of the light source LS1 emits blue light beam and the light emitting element 21 of the light source LS2 emits red light beam is used. For example, as the light emitting element 11 of the light source LS1, a light source to emit the light beam having a wavelength around 455 nm with better efficiency as an excitation light source of the phosphor (fluorescent material) is used, and as the light emitting element 21 of the light source LS2, a light source to emit the light beam having a wavelength near 640 nm for red color is used. The configurations of the light emitting element 11 of the light source LS1 and the light emitting element 21 of the light source LS2 are interchangeable.

Similarly, when the light source having a higher-color reproductivity at lower-cost is provided, a configuration in which the illumination device 1B in FIG. 3 is used. The excitation light source LD1 emits blue light beam, the solid light source LD2 emits bule light beam different from the blue light beam emitted from the excitation light source LD1, and the solid light source LD3 emits red light beam is used. For example, the excitation light source LD1 emits the light beam having a wavelength around 455 nm having a better efficiency as an excitation light source to the fluorescent material, the solid light source LD2 emits the light beam having a wavelength around 465 nm that is a vivid blue color, and the solid light source LD2 emits the light beam having a wavelength around 640 nm as red color. The configuration of the light source LS1 and the configuration of the light source LS2 are interchangeable.

Figure 4:
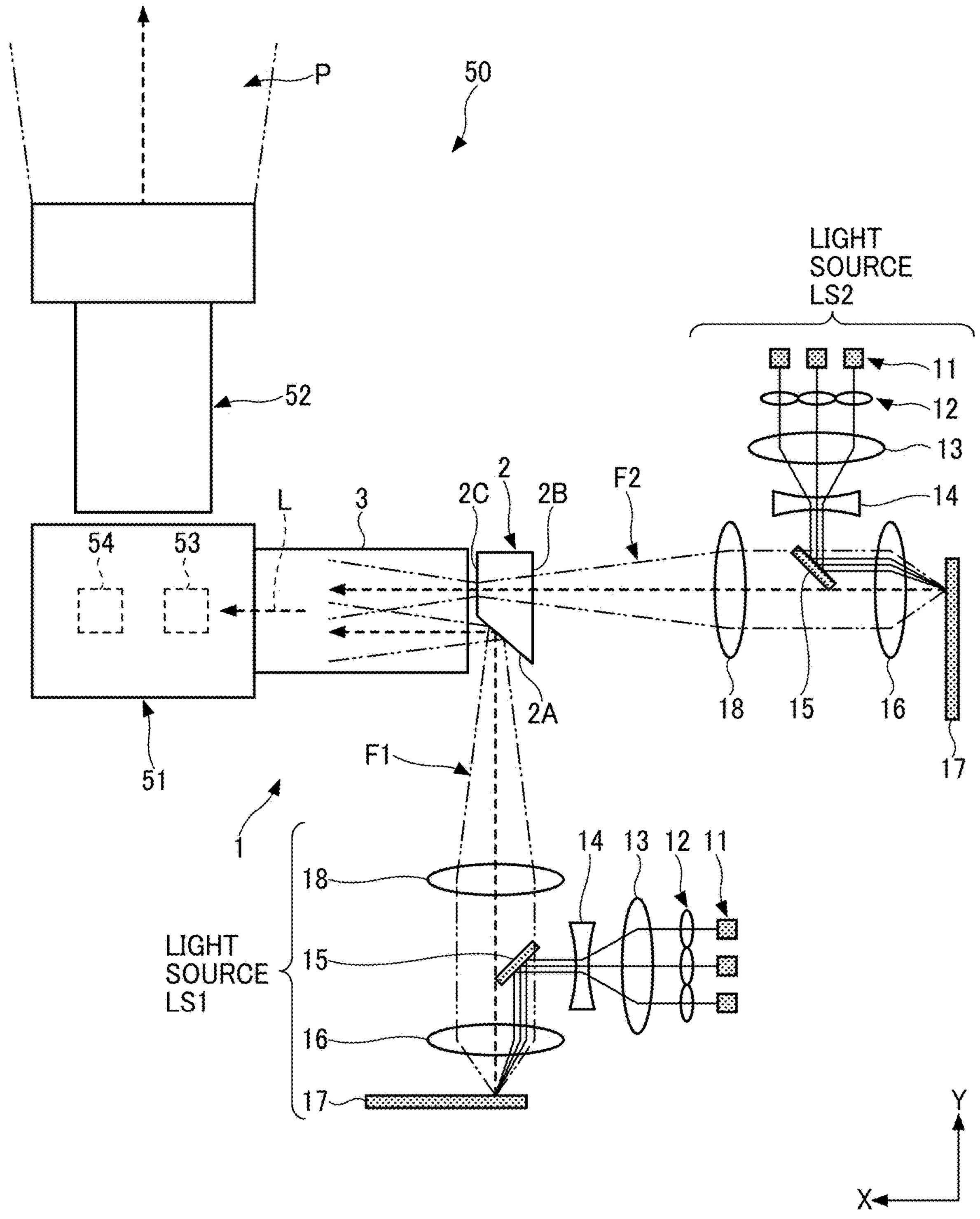
FIG. 4 is a diagram of a projector including the illumination device according to the present embodiment.

FIG. 4 is a diagram of the configuration of a projector 50 provided with the illumination device according to the present embodiment. The projector 50 includes an illumination optical system 51 and a projection lens 52 on the downstream along the light emission direction of the illumination device 1 in FIG. 1.

The light beam L enters the illumination optical system 51 from the light homogenizer (e.g., a light tunnel) of the illumination device 1. The illumination optical system 51 emits the light to the projection lens 52. The illumination optical system 51 includes various elements such as a color wheel 53 and a light modulator 54. The color wheel 53 is a disk including filters for red, blue, and green that are integrated and converts the incident light beam L into red light beam, green light beam and blue light beam in time division manner while rotating the disk. The incident light beam K is emitted from the illumination device 1. Examples of the light modulator 54 includes a liquid crystal or a digital micromirror device (DMD). The light modulator 54 spatially modulates the light passing through the color wheel 53.

The illumination device further includes a color wheel between the light combiner and the light homogenizer.

A projector includes: the illumination device described above; and a projection lens.

Figure 5:
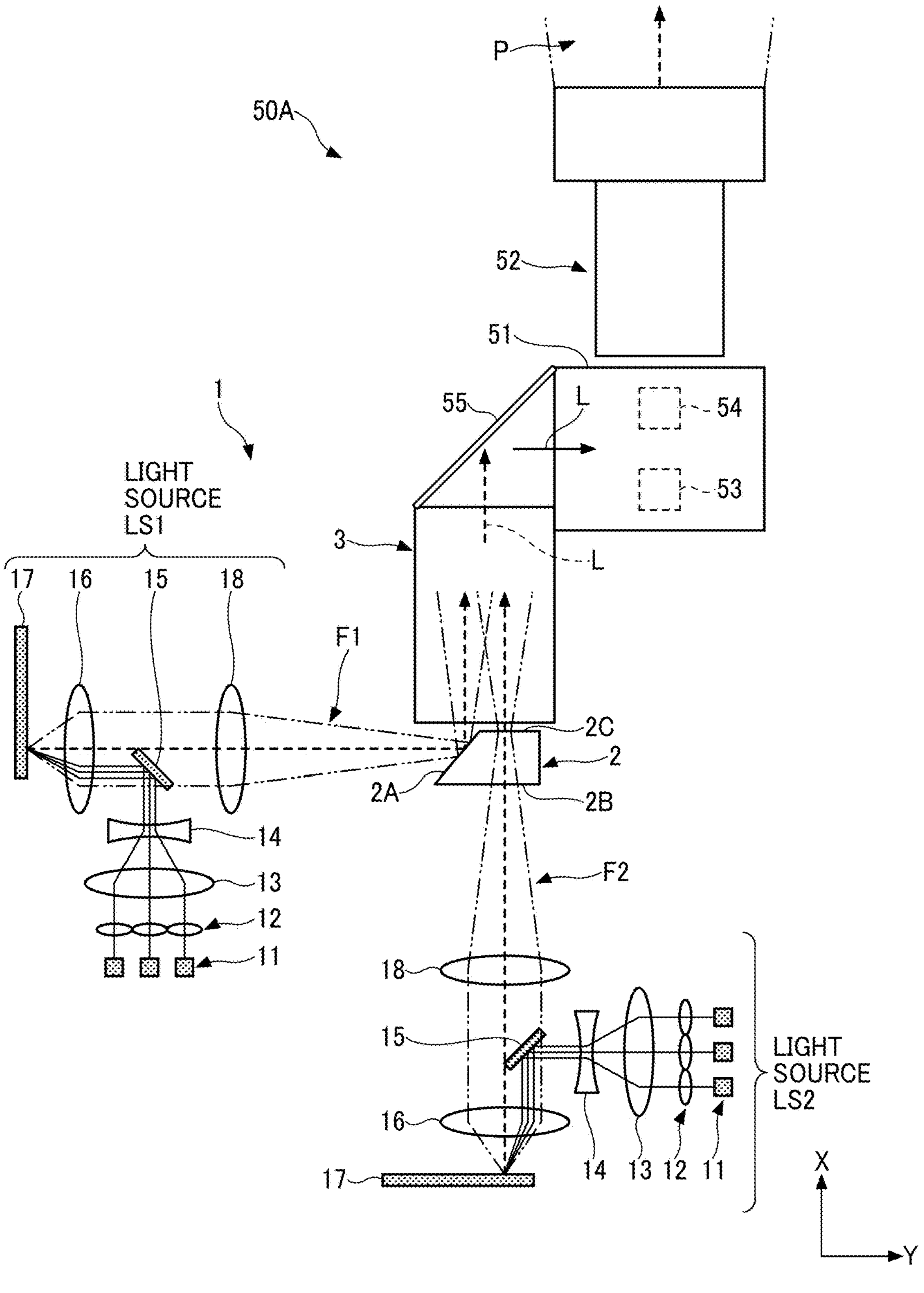
FIG. 5 is a diagram of a projector including a modified configuration.

In FIGS. 4 and 5, the color wheel 53 and the light modulator 54 are arranged in the illumination optical system 51 as an example. The arrangement of the color wheel 53 and the light modulator 54 are not limited thereto.

The projection lens 52 projects the light modulated by the light modulator 54 in the illumination optical system 51 as a projection image P. In FIG. 4, the direction (Y-direction) in which the projection lens 52 projects the projection image P is orthogonal to the optical axis (X-direction) of the light beam 1, emitted from the illumination device 1. The illumination optical system 51 and the projection lens 52 are arranged along the Y-direction. In other words, the illumination device 1 is arranged so that the optical axis of the light beam L emitted from the illumination device 1 is orthogonal to the arrangement direction (Y-direction) of the illumination optical system 51 and the projection lens 52. In this configuration, the light beam L emitted from the illumination device 1 directly enters the illumination optical system 51.

In the present embodiment, in the illumination device 1, the light source LS1 of the two light sources is disposed at a position in which the optical axis of the light beam F1 is arranged at 90 degrees with respect to the incident direction of the light beam F1 into the light homogenizer 3 (and the outgoing direction of the light beam L from the light homogenizer 3 in FIG. 4). Further, the light source LS1 and the light source LS2 are arranged so that the angle formed by the optical axes of the light beam F1 emitted from the light source LS1 and the light beam F2 emitted from the LS2 becomes 90 degrees.

According to the configuration, when the illumination device 1 is applied to the projector 50 in the arrangement in FIG. 4, the first heat source including the two light sources LS1 and LS2 and the second heat source including, for example, the projection lens 52 and the light modulator 54 are physically separate from each other. As a result, heat sources are not concentrated in the projector 50, and such a configuration is advantageous in thermal design.

In an comparative example of a typical configuration, two light sources are separated by 180 degrees. In a case where the typical configuration is applied to the illumination device as illustrated in FIG. 4, the light source LS2 is disposed in the vicinity of the projection lens. Thus, the heat sources may be concentrated in the projector 50.

In FIG. 4, the illumination device 1 illustrated in FIG. 1 is applied, but the illumination device 1A illustrated in FIG. 2 or the illumination device 1B illustrated in FIG. 3 may be applied.

FIG. 5 is a diagram of the configuration of the projector 50A as a modification. In FIG. 5, the light beam L is emitted from the illumination device 1 along the X-direction (the optical axis of the light beam L). The direction of the projection image P emitted from the projection lens 52 may be the same direction with the optical axis of the light beam L (X-direction). In other words, the illumination device 1 is arranged so that the optical axis of the light beam L emitted from the illumination device 1 is in the same direction with respect to the direction (X-direction) in which illumination optical system 51 and the projection lens 52 are arranged. In this case, the light beam L emitted from the illumination device 1 enters the illumination optical system 51 after the direction of the emitted light L is changed by using a reflective optical element 55 such as a mirror.

When the illumination device 1 is applied to the projector 50 in the arrangement in FIG. 5, the first heat source including the two light sources LS1 and LS2 and the second heat source including, for example, the projection lens 52 and the light modulator 54 are physically further separate from each other. Accordingly, the heat sources are not concentrated in the projector 50, and such a configuration is further advantageous in the thermal design.

The arrangement of the illumination device, the projection lens, and the illumination optical system in the projector is not limited to the examples in FIGS. 4 and 5.

As described above, when the illumination device 1, 1A, or 1B illustrated in FIGS. 1 to 3 is applied to the projector 50 or 50A, the size of the projector 50 or 50A is reduced and the efficiency is increased similar to the illumination device.

Figure 6:
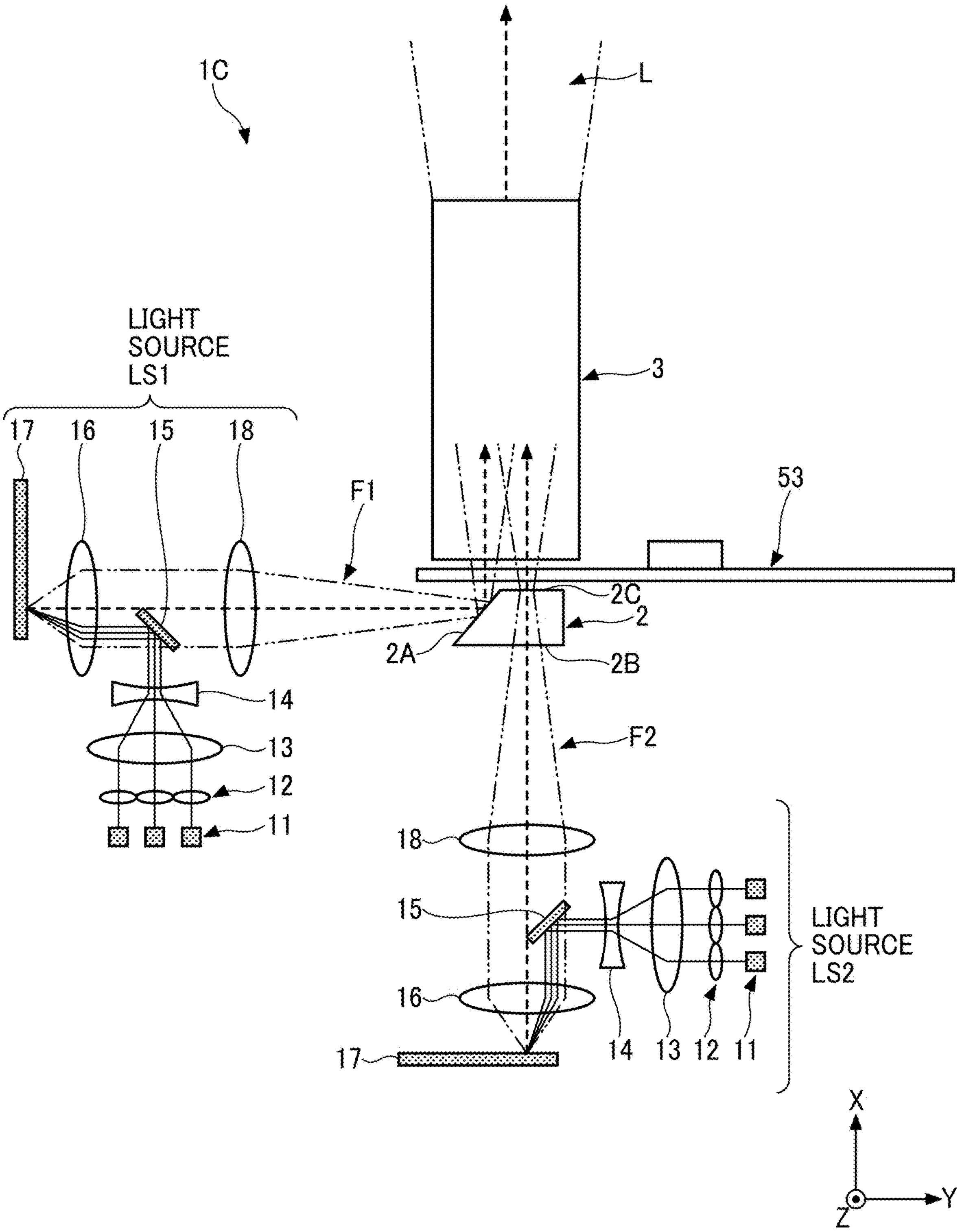
FIG. 6 is a diagram of an illumination device as a first modification.

FIG. 6 is a diagram of the illumination device 1C as a first modification. The basic configuration of the illumination device in FIG. 6 is the same as that of in FIG. 1. In FIGS. 6 to 12, the axis orthogonal to both X-axis and Y-axis is Z-axis. The direction along the Z-axis is Z-direction. For example, in FIG. 6, the Z-axis is perpendicular to the drawing.

As illustrated in FIG. 6, the color wheel 53 is disposed in the illumination device 1C. In the example in FIG. 6, the color wheel 53 is disposed between the light combiner 2 and the light homogenizer 3, and the light beam emitted from the light combiner 2 enters the light homogenizer 3 after passing through the color wheel 53 while rotating.

In the present embodiment, the light combiner 2 and the light homogenizer 3 are separated (separate configuration), and the separate configuration is different from the typical configuration. Accordingly, the color wheel is disposed between the light combiner 2 and the light homogenizer 3 like the illumination device 1C as the first modification in FIG. 6. Since the light beam is processed by the color wheel 53 before the light beam enters the light homogenizer 3, the unevenness caused by the color wheel 53 is homogenized by the light homogenizer 3. As a result, the unevenness of the projection image P of the projector 50 is further reduced.

The configuration using the illumination device 1 in FIG. 1 is illustrated in FIG. 6 as an example. As other examples, in the configuration of the illumination device 1A in FIG. 3 and the configuration of the illumination device 1B in FIG. 3, the color wheel 53 may be disposed between the light combiner 2 and the light homogenizer 3.

Figure 7:
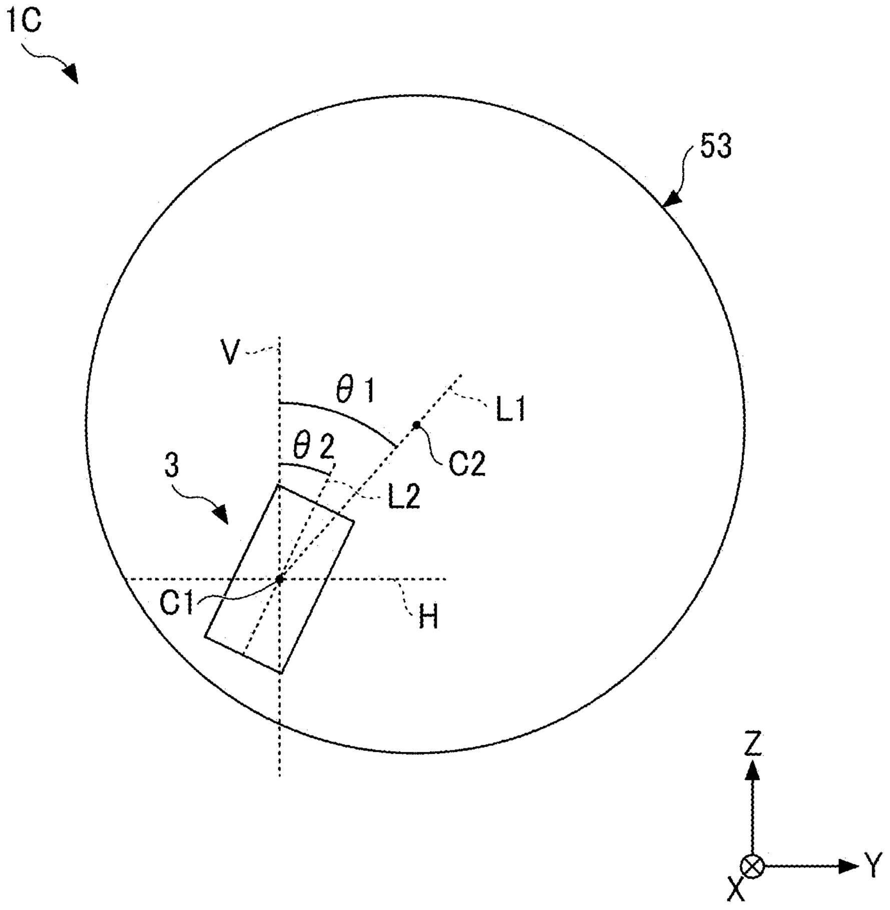
FIG. 7 is a diagram of a configuration of the light homogenizer and the color wheel in the illumination device in FIG. 6.

FIG. 7 is a diagram of the arrangement of the light homogenizer 3 and the color wheel 53 in the illumination device 1C in FIG. 6. FIG. 7 is also a diagram of the illumination device 1C as viewed from the negative X-direction. In FIG. 7, the light homogenizer 3 is a light tunnel as an example. In this example, as an definition, a horizontal direction is the Y-direction, and a horizontal axis H is parallel to the Y-direction. Similarly, as an definition, a direction orthogonal to the X-direction and the Y-direction (vertical direction on the drawing) is a vertical direction, and a vertical axis V is parallel to the vertical direction.

As illustrated in FIG. 7, the light tunnel 3 has an outer shape of a substantially rectangular shape as viewed from the X-direction. The horizontal axis H and the vertical axis V described above intersect each other at the center C1 of the rectangular shape of the light homogenizer 3 (e.g., light tunnel). The horizontal axis H of the light homogenizer 3 (e.g., light tunnel) is on a plane parallel to a plane (parallel to the XY-plane) formed by the optical axes of the light beams emitted from the two light sources LS1 and LS2, and the vertical axis V of the light homogenizer 3 (e.g., light tunnel) is on a plane orthogonal to the horizontal axis H and intersecting each other. Further, the color wheel 53 is disposed around the rotation axis parallel to the X-direction. In FIG. 7, the center of the rotation axis is consistent with the center C2 of the color wheel.

The horizontal axis H and the vertical axis V may also be defined below. The first axis (first optical axis, first direction) is the optical axis of the light beam F1 emitted from the light source LS1, the second axis (second optical axis, second direction) is the optical axis of the light beam F2 emitted from the light source LS2, and the third axis (third optical axis, third direction) is the optical axis of the light beam passing through the light homogenizer 3 (e.g., light tunnel). The first axis, the second axis, and the third axis are disposed on the same plane. In FIGS. 6 and 7, the same plane described above is the XY-plane or a plane parallel to the XY-plane, the first axis (first direction) is along the Y-axis (Y-direction) and the second axis (second direction) and the third axis (third direction) are parallel to the X-direction. In an orthogonal plane perpendicular to the third axis (i.e., the orthogonal plane is the plane of the drawing in FIG. 7), the horizontal axis H is along the intersection line with the XY-plane and the vertical axis is orthogonal to the horizontal axis V and the orthogonal plane. The horizontal axis H and the vertical axis V are defined so as to intersect each other at the center C1 (first center) in the cross section of the light homogenizer 3 (e.g., light tunnel) on the orthogonal plane.

Herein, the center C1 of the light homogenizer 3 (e.g., light tunnel) is consistent with the center of the coordinate system, and the angle formed by the vertical axis V and the straight line L1 connecting the center C1 to the center C2 of the color wheel 53 is defined as θ1. Further, the center C1 of the light homogenizer 3 (e.g., light tunnel) is consistent with the center of the coordinate system, and an angle formed by the vertical axis V and a straight line L2 extending along the longer side of the of the light homogenizer 3 is defined as θ2. At this time, by arranging the light homogenizer 3 and the color wheel 53 such that 0≤θ2≤θ1 is satisfied, the light use efficiency of the color wheel 53 is increased.

In the illumination device, a first optical axis of the first light beam emitted from the first light source is arranged at 90 degrees with respect to a second optical axis of the second light beam incident on the light homogenizer, the first optical axis and the second optical axis defines a first plane, a third optical axis of the third light beam passing through the light homogenizer is parallel to the second optical axis, and a plane orthogonal to the third optical axis defines a second plane, the second plane having: a horizontal axis at which the first plane intersects with the second plane; and a vertical axis orthogonal to the horizontal axis along the second plane, the horizontal axis intersects with the vertical axis at a first center that is a center of a cross-section of the light homogenizer on the second plane. The light homogenizer and the color wheel are arranged to satisfy a conditional expression:

$$0 \leq \theta 2 \leq \theta 1,$$

where θ1 is an angle formed by the vertical axis and a line from the first center to a second center of the color wheel, at which the first center is a center of a coordination system, and θ2 is an angle between the vertical axis and a line extending from the first center along a longitudinal direction of the cross-section of the light homogenizer.

Figure 8:
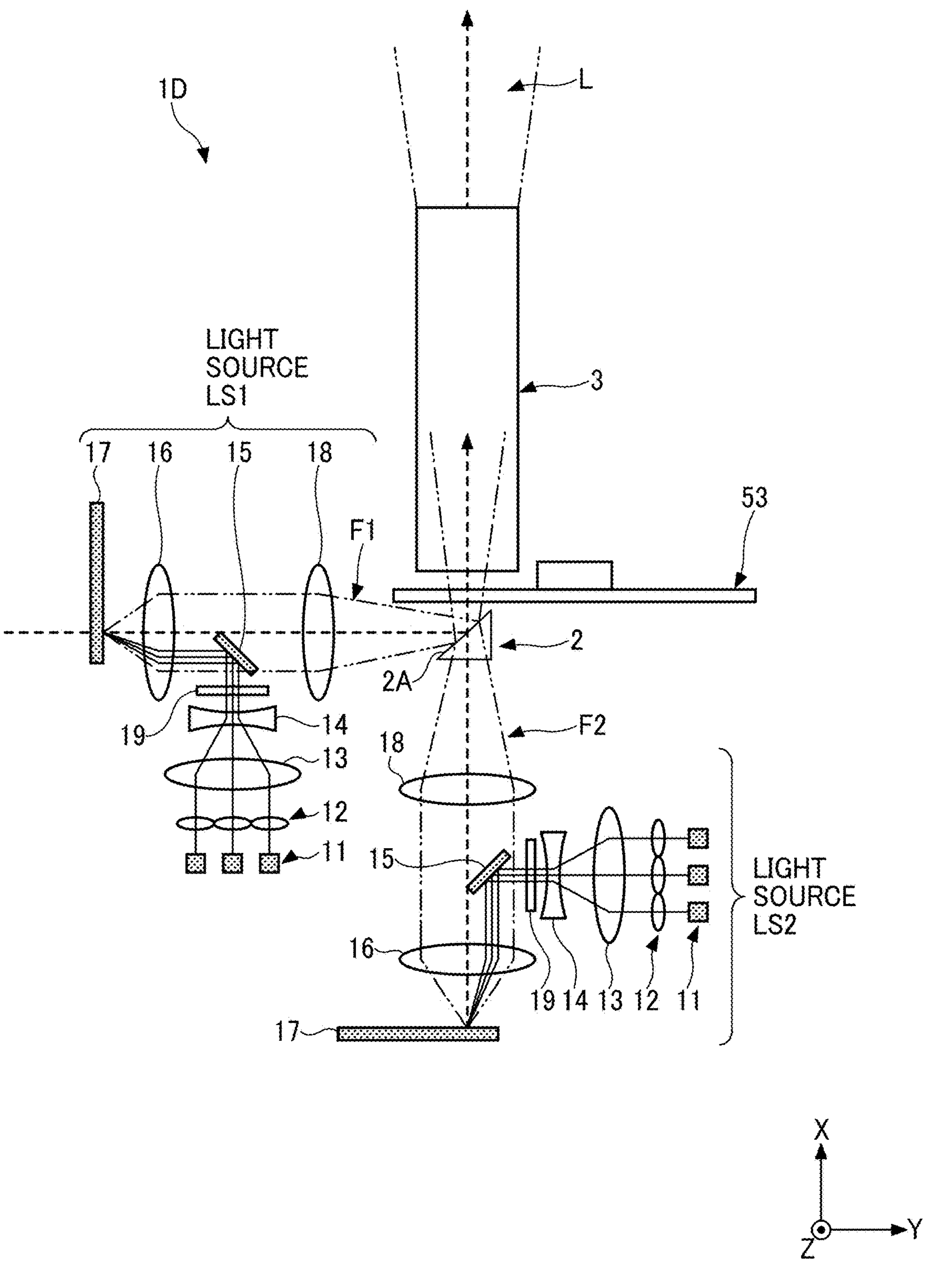
FIG. 8 is a diagram of an illumination device as a second modification.

FIG. 8 is a diagram of the illumination device 1D as a second modification. The basic configuration of the illumination device is the same as that of FIG. 6. As illustrated in FIG. 8, the light source LS1 and the light source LS2 may include at least one light profile adjuster 19. In FIG. 8, in each of the light source LS1 and the light source LS2, a light profile adjuster 19 is disposed between the optical element 14 and the reflective optical element 15 (profile adjuster configuration). According to the profile adjuster configuration, the illumination device having a higher-efficiency illumination is provided.

In the illumination device, at least one of the two light sources includes one or more of light profile adjustment elements.

Either the light source LS1 or the light source LS2 may include the light profile adjuster 19. The position of the light profile adjuster 19 is not limited to the position in the configuration in FIG. 8, and may be arranged at another position along the optical path within each of the light sources LS1 and LS2. Multiple light profile adjusters 19 may be provided each of the light sources LS1 and LS2. Similar to the example in FIG. 4, the illumination device 1D may have a configuration in which the color wheel 53 is provided inside the illumination optical system 51.

In the illumination device, at least one of the first light source or the second light source includes one or more of light profile adjuster.

Figure 9:
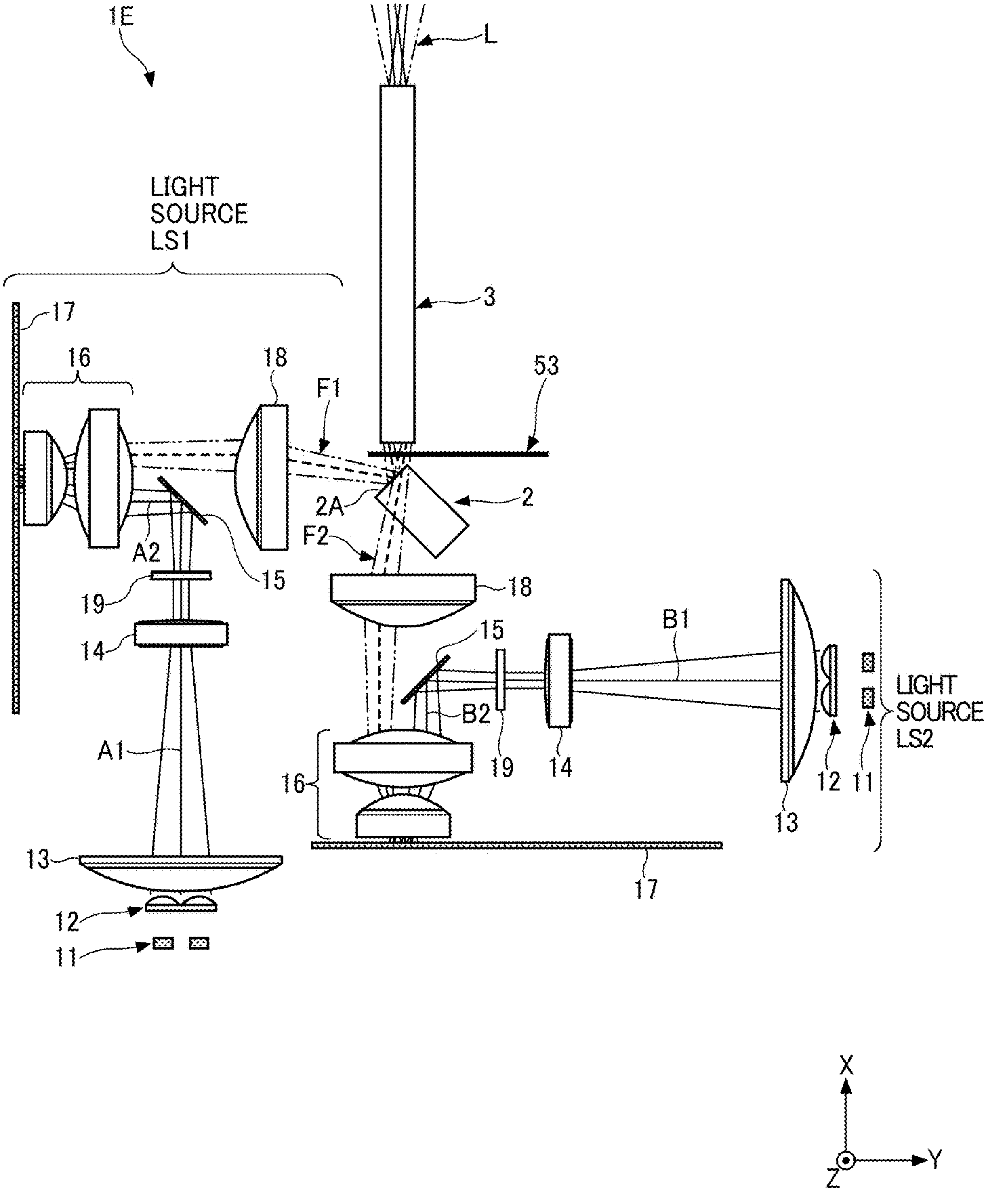
FIG. 9 is a diagram of an illumination device as a third modification.
Figure 10:
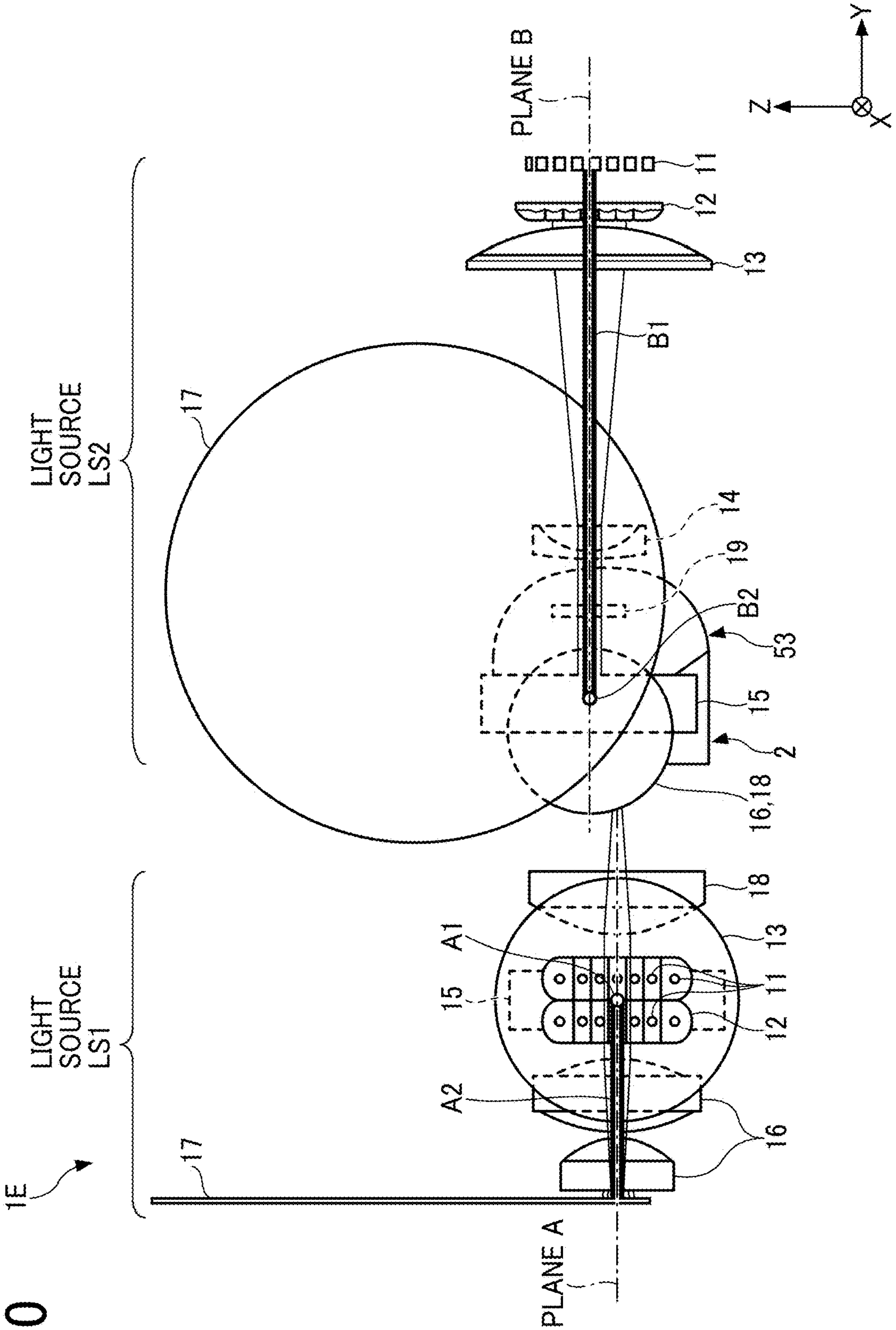
FIG. 10 is a diagram of the illumination device in FIG. 9 as viewed from another direction.

FIGS. 9 and 10 are diagrams of the illumination device 1E as a third modification. FIG. 9 is a diagram of the configuration of the illumination device 1E projected on the XY-plan as viewed from the positive Z-direction. FIG. 10 is a diagram of the configuration of the illumination device 1E FIG. 9 projected on the YZ-plan as viewed from the negative X-direction. In FIG. 9, the configuration of the illumination device 1E projected on the XY-plan is similar to that of the illumination device 1D in FIG. 8 as a second modification.

As illustrated in FIG. 10, in the light source LS1, a plane formed by an optical axis from the light emitting element 11 to the wavelength converter 17 is referred to as a “plane A”. Herein, as illustrated in FIGS. 9 and 10, the plane A corresponds to a plane including both a substantially central axis (optical axis A1) of the optical element 13 and an optical axis A2 in which the optical axis A1 is bent by the reflective optical element 15. The light beam F1 emitted from the light source LS1 to the light homogenizer 3 is also arranged along the plane A. As illustrated in FIG. 10, the plane A is parallel to the XY-plane.

Similarly, as illustrated in FIG. 10, in the light source LS2, a plane formed by the optical axis from the light emitting element 11 to the wavelength converter 17 is referred to as a “plane B”. Herein, as illustrated in FIGS. 9 and 10, the plane B corresponds to a plane including both a substantially central axis (optical axis B1) of the optical element 13 and an optical axis B2 in which the optical axis B1 is bent by the reflective optical element 15. The light beam F2 emitted from the light source LS2 enters the light homogenizer 3 is also arranged along the plane B. As illustrated in FIG. 10, the plane B is parallel to the XY-plane.

As illustrated in FIG. 10, in the illumination device 1E, the plane A and the plane B do not intersect each other. In other words, the light source LS1 and the light source LS2 are arranged so that the plane A and the plane B are arranged in parallel with each other at an equal distance in the Z-direction. As a result, coupling is performed with higher efficiency with respect to the longer side of the light homogenizer 3.

In the illumination device, the first light source includes: a first light emitting element to emit the first light beam; and a first wavelength converter to convert the first light beam, and the second light source includes: a second light emitting element to emit the second light beam; and a second wavelength converter to convert the second light beam, a first optical axis of the first light beam is orthogonal to a first perpendicular line perpendicular to a first converting surface of the first wavelength converter, a second optical axis of the second light beam is orthogonal to a second perpendicular line perpendicular to a second converting surface of the second wavelength converter, the first optical axis and the first perpendicular line forms a third plane; and the second optical axis and the second perpendicular line forms a fourth plane, and the third plane are parallel to the fourth plane and at different positions different in a direction perpendicular to the third plane and the fourth plane.

In the illumination device, the first light source and the second light source are arranged at positions at which profiles of condensed light spots at an entrance of the light homogenizer are different.

Figure 11:
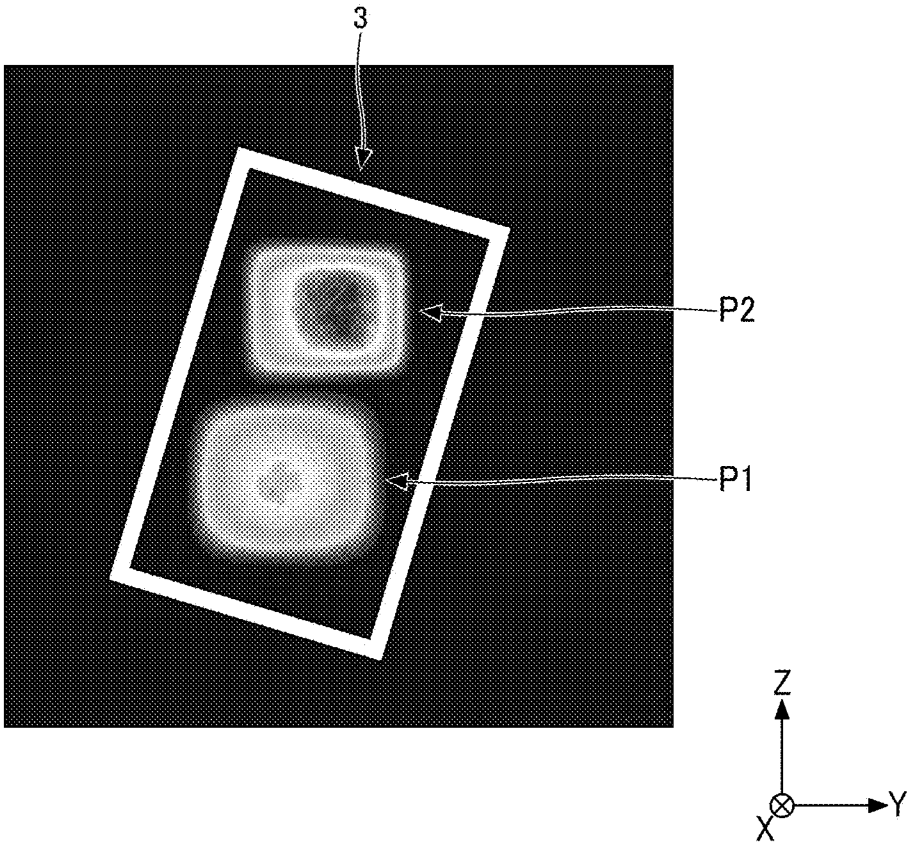
FIG. 11 is a diagram of condensed light spots on the entrance of the light homogenizer.

FIG. 11 is a diagram of condensed light spots at the entrance of the light homogenizer 3 in the illumination device as a third modification. In FIG. 11, the profile P1 of the condensed light spot by the light source LS1 and the profile P2 of the condensed light spot by the light source L2 at the entrance of the light homogenizer 3 are illustrated. The profile P1 of the condensed light spot is formed at a relatively closer position to the light combiner 2 because the light beam emitted from the light source LS1 is reflected by the reflection surface 2A of the light combiner 2 and enters the light homogenizer 3. By contrast, the profile P2 of the condensed light spot is formed at a relatively closer position to the entrance of the light homogenizer 3 because the light beam emitted from the light source LS2 directly propagates to the light homogenizer 3 without reflection by the light combiner 2. Accordingly, the profile P1 of the condensed light spot by the light source LS1 and the profile P2 of the condensed light spot by the light source L2 are different. In other words, the profile P1 and the profile P2 are characterized by the difference. In other words, the two light sources LS1 and LS2 are arranged so that there is a difference between the profiles P1 and P2 of the condensed light spots at the entrance of the light homogenizer 3. As illustrated in FIG. 11, the profile P1 of the condensed light spot by the light source LS1 reflected by the reflection surface 2A of the light combiner 2 is relatively larger, and the profile P2 of the condensed light spot by the light source LS2 not passing through the reflection surface 2A of the light combiner 2 is relatively smaller. As a result, the loss by combining the light beam F1 and the light beam F2 is minimized.

Further, the profile P1 of the condensed light by the light source LS1 and the profile P2 of the condensed light by the light source LS2 are tilted with respect to the longer side of the light homogenizer 3 (a longer side of the rectangular shape of the light homogenizer 3 at the entrance or a shorter side in FIG. 11). In FIG. 11, the shape of the entrance of the light homogenizer 3 is substantially rectangular as viewed from the X-direction, which is similarly to the example in FIG. 7, and the light homogenizer 3 is disposed so that the longer side and the shorter side of the light homogenizer are titled with respect to the Y-direction. As described above, in the illumination device 1E of the third modification (FIG. 10), a plane A including the optical axes A1 and A2 of the light source LS1 and a plane B including the optical axes B1 and B2 of the light source LS2 are parallel to the XV plane. Accordingly, in the example in FIG. 11, the longer and shorter sides of the profiles P1 and P2 of the condensed light spots by the two light source LS1 and LS2 are titled with respect to the longer side and shorter sides of the light homogenizer 3. In other word, the vertical directions and the horizontal directions of the profiles P1 and P2 and the vertical directions and the horizontal directions of the shape of the entrance of the light homogenizer 3 are reciprocally tilted.

Further, as illustrated in FIG. 11, the centers of the profiles P1 and P2 of the condensed light spots by the two light source LS1 and LS2 are arranged so as to be shifted (offset) in the horizontal direction (Y-direction in FIG. 11) within the range of the entrance of the light homogenizer 3. Herein, the horizontal direction is also a direction parallel to the direction of the light beam F1 incident on the reflection surface 2A. With such a configuration, since internal reflection within the light homogenizer 3 increases to some extent, homogenization of the light intensity is increased, and illumination homogenization within the projection screen (projection image P) is further increased.

In the illumination device, the light homogenizer has an entrance having a rectangular cross-sectional shape having vertical sides and horizontal sides, the first light beam forms a first condensed light spot at the entrance of the light homogenizer; the second light beam forms a second condensed light spot at the entrance of the light homogenizer; the first condensed light spot having a first profile having a substantially rectangular shape having first vertical sides and first horizontal sides, the first vertical sides and the first horizontal sides of which are respectively inclined with the vertical sides and horizontal sides of the entrance of the light homogenizer, the second condensed light spot having a second profile having a substantially rectangular shape having second vertical sides and second horizontal sides, the second vertical sides and the second horizontal sides of which are respectively inclined with the vertical sides and horizontal sides of the entrance of the light homogenizer.

In the illumination device, a first center position of the first profile is offset from a second center position of the second profile in a direction parallel to the first direction within a range of the entrance of the light homogenizer.

Figure 12:
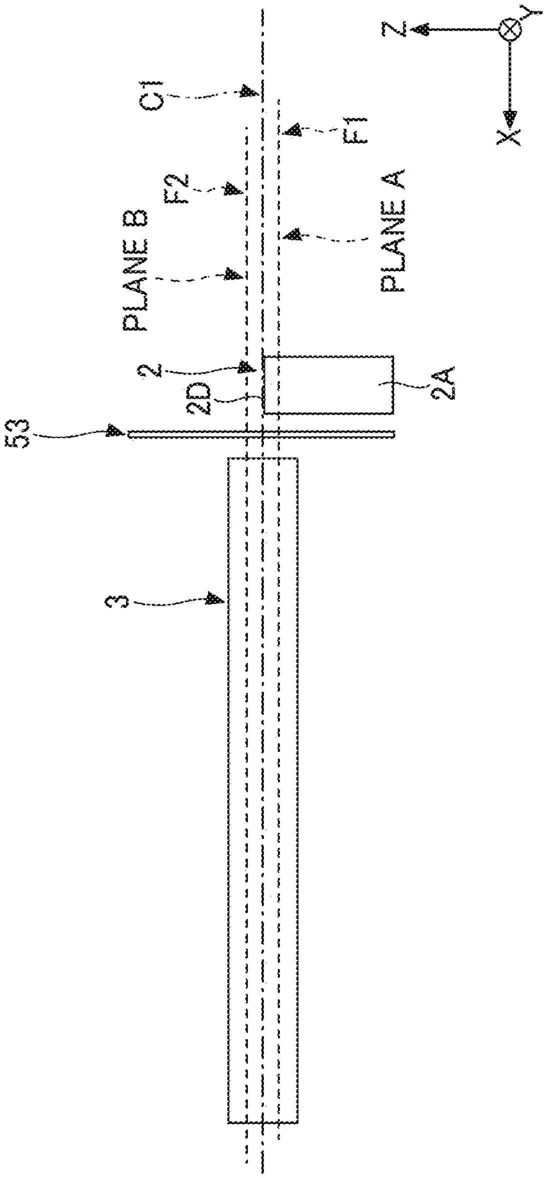
FIG. 12 is a diagram of a configuration of a light combiner, the light homogenizer in FIG. 11 and the two planes of the two light sources.

FIG. 12 is a diagram of a configuration including the light combiner 2, the light homogenizer 3 in the third modification, and the planes A and B of the two light sources LS1 and LS2. In FIG. 12, the light combiner 2, the light homogenizer 3 in the third modification, and the planes A and B of the two light sources LS1 and LS2 are illustrated as relevant elements as viewed from the negative Y-direction.

The light combiner 2 is an optical element having a reflection surface 2A. In FIG. 12, the light combiner 2 is a triangular prism. The light combiner 2 may have one or more of the reflecting surfaces. In FIG. 12, the light emitted from the light source LS1 and the light emitted from the light source LS2 are combined as single illumination light. In FIG. 12, the center axis C1 is defined with respect to the light combiner 2 (see also FIG. 7), the plane A and the plane B (FIG. 10) are at both side of the center axis C1.

The light beam F1 and the light beam F2 enter the light combiner 2. When the light combiner 2 is arranged in such a manner (FIG. 12), the light combiner 2 reflects the light beam F1. By contrast, the light beam F2 passes through a position offset in the positive Z-direction from the side surface 2D, which is the positive Z-direction side of the light combiner 2, without passing through the light combiner 2 and enters the light homogenizer to combine with the light beam F1 (reflection light). Herein, the light combiner 2 is formed separately from the light homogenizer 3. According to the configuration, the loss of the combined light in the straight direction is reduced.

An illumination device includes: a first light source to emit a first light beam having a first intensity distribution in a first direction; a second light source to emit a second light beam having a second intensity distribution in a second direction different from the first direction; a light combiner to combine the first light beam emitted from the first light source and the second light beam emitted from the second light source; and a light homogenizer separated from the light combiner and to homogenize the first intensity distribution of the first light beam and the second intensity distribution of the second light beam to generate and emit a third light beam. The first light beam is reflected by the light combiner and is incident on the light homogenizer in the second direction; and the second light beam is incident on the light homogenizer in the second direction without passing through the light combiner.

Further, in the configuration of the third modification illustrated in FIG. 12, the number of incident surfaces of the light combiner 2 with respect to the two light sources LS1 and LS2 may be at least one surface of the reflection surface 2A, and can be reduced with respect to the number of light sources, so that the shape of the light combiner 2 can be simplified. Further, since the light combiner is formed separately from the light homogenizer 3, the color wheel 53 can be disposed between the light combiner 2 and the light homogenizer 3. As a result, unevenness of the amount of the light is reduced.

The present embodiment has been described with reference to specific examples. However, the present disclosure is not limited to these embodiments. Those in which a person skilled in the art makes appropriate design changes to these specific examples are also included in the scope of the present disclosure as long as they have the features of the present disclosure. The elements, arrangement, condition, shape, and the like of each of the above-described specific examples are not limited to those illustrated, and may be changed as appropriate. As long as there is no technical contradiction, the combination of elements provided in each of the above-described specific examples can be appropriately changed.

An embodiment of the present invention is as follows, for example.

In a first aspect, an illumination device includes two light sources to emit two light beams, a light combiner to combine the two light beam emitted from the two light sources, and a light homogenizer. The light combiner reflects one light beam and transmits the light beam of the two light beams incident from the two directions to combine. The light combiner is a prism including four or more of the surfaces (multiple surfaces), and one surface of the multiple surfaces is a reflection surface to generate the reflection light beam and two surfaces opposite each other are transmission surfaces to generate transmission light beam. The light combiner and the light homogenizer are separated. The light beam incident on the reflection surface and the light beam incident on the transmission surface in the light combiner are not overlapped.

In a second aspect, in the illumination device according to the first aspect, the light homogenizer is a rod integrator.

In a third aspect, in the illumination device according to the first aspect, the light homogenizer is a light tunnel.

In a fourth aspect, in the illumination device according to any one of the first aspect to the third aspect, one of the light source of the two light sources is arranged at 90 degrees with respect to the light beam incident direction to the light homogenizer. The optical axis of the one light source and an optical axis of the other light source of the two light sources is 90 degrees.

In a fifth aspect, in the illumination device according to any one the first aspect to the fourth aspect, at least one of the two light sources includes an excitation light source and a wavelength converter.

In a sixth aspect, in the illumination device according to any one of the first aspect to the fifth aspect, at least one of the two light sources includes multiple optical elements.

In a seventh aspect, the illumination device according to the any one of the first aspect to the sixth aspect, two spectra of two light beams combined by the light combiner are different each other.

In an eighth aspect, in the illumination device according to any one of the first aspect to the seventh aspect, at least one of an incident surface and an exit surface of the prism is a diffusion surface.

In a ninth aspect, in the illumination device according to any one of the first aspect to the eighth aspect, a color wheel is disposed between the light combiner and the light homogenizer.

In a tenth aspect, 10. the illumination device according to the ninth aspect, a first axis along an optical axis of the transmission light beam of the two light beams emitted from the two light sources, a second axis along an optical axis of the reflection light beam, and a third axis along an optical axis passing through the light homogenizer are arrange on a same plane. In an orthogonal plane is orthogonal to the third axis, a horizontal axis intersects with the same plane, and a vertical axis is orthogonal to the horizontal axis along the orthogonal plane. The horizontal axis and the vertical axis intersect each other at a first center of the shape of the light homogenizer on the orthogonal plane. The light homogenizer and the color wheel are arranged with a conditional expression below satisfied: $0 \leq \theta 2 \leq \theta 1$, where $\theta 1$ is an angle between the vertical axis and a line from the first center to a second center of the color wheel, at which the first center is a center of a coordination system, and $\theta 2$ is an angle between the vertical axis and a line along a longer side of the light homogenizer in a cross section along the orthogonal plane.

In an eleventh aspect, in the illumination device according to any one of the first aspect to the tenth aspect, at least one of the two light sources includes at least one light profile adjuster.

In the twelfth aspect, the illumination device according to the any one of the first aspect to the eleventh aspect, the two light sources include a light emitting element and a wavelength converter, a plane A is formed by an optical axis from the light source to the wavelength converter in one light source of the two light sources, and a plane B is formed by an optical axis from the light source to the wavelength converter in the other light source of the two light sources. The two light sources are arranged at positions in which the plane A and the plane B are parallel each other and different in a vertical direction.

In a thirteenth aspect, in the illumination device according to any one of the first aspect to the twelfth aspect, the two light sources are arranged so that there is a difference in the condensed light spots at an entrance of the light homogenizer.

In a fourteenth aspect, in the illumination device according to any one of the first aspect to the thirteenth aspect, a shape of the entrance of the light homogenizer in a cross section is a substantially rectangular shape. A vertical and a horizontal directions of the profiles of the condensed light spots at the entrance of the light homogenizer are tilted with respect to vertical and horizontal directions of the light homogenizer, and center positions of the profiles are shifted (offset) in a direction parallel to a direction in which light incident on the reflection surface within a range of the entrance of the light homogenizer.

In a fifteenth aspect, an illumination device includes two light sources, a light combiner to combine the two light emitted from the two illumination device, and a light homogenizer. The light combiner reflets one light and passed the other light without propagating the light combiner to combine. The light combiner enters the combined light to the light homogenizer. The light combiner and the light homogenizer are separately formed.

In a sixteenth aspect, a projector includes the illumination device according to any one of the first aspect to the fifteenth aspect, and a projection lens.

In a seventeenth aspect, an illumination device includes: a first light source to emit a first light beam having a first intensity distribution in a first direction; a second light source to emit a second light beam having a second intensity distribution in a second direction different from the first direction; a light combiner to combine the first light beam emitted from the first light source and the second light beam emitted from the second light source; and a light homogenizer, which is separate from the light combiner, to homogenize the first intensity distribution of the first light beam and the second intensity distribution of the second light beam to generate and emit a third light beam. The light combiner is a polygonal prism including: a reflection surface to reflect the first light beam to the light homogenizer in the second direction to generate a reflection light beam; and multiple transmission surfaces having opposite surfaces to transmit the second light beam to the light homogenizer in the second direction to generate a transmission light beam, the light homogenizer homogenizes the reflection light beam and the transmission light beam and emits the third light beam, and the first light beam incident on the reflection surface and the second light beam incident on the transmission surfaces propagate in different optical paths in the light combiner.

In an eighteenth aspect, in the illumination device according to the seventeenth aspect; the light homogenizer includes a rod integrator.

In a nineteenth aspect, in the illumination device according to the seventeenth aspect, the light homogenizer includes a light tunnel.

In a twentieth aspect, in the illumination device according to any one of the seventeenth aspect to the nineteenth aspect, a first optical axis of the first light beam emitted from the first light source is arranged at 90 degrees with respect to a second optical axis of the second light beam incident on the light homogenizer.

In a twenty-first aspect; in the illumination device according to any one of the seventeenth aspect to the twentieth aspect, at least one of the first light source or the second light source includes an excitation light source and a wavelength converter.

In a twenty-second aspect, in the illumination device according to any one of the seventeenth aspect to the twenty-first aspect, at least one of the first light source or the second light source includes multiple optical elements.

In a twenty-third aspect, in the illumination device according to any one of the seventeenth aspect to the twenty-second aspect, a first spectra of the first light beam is different from a second spectra of the second light beam combined with the first light beam by the light combiner.

In a twenty-fourth aspect, in the illumination device according to any one of the seventeenth aspect to the twenty-third aspect, at least one of an incident surface or an exit surface of the polygonal prism is a diffuse surface.

In a twenty-fifth aspect, in the illumination device according to any one of the seventeenth aspect to the twenty-fourth aspect further includes a color wheel between the light combiner and the light homogenizer.

In a twenty-sixth aspect, in illumination device according to the twenty-fifth aspect, a first optical axis of the first light beam emitted from the first light source is arranged at 90 degrees with respect to a second optical axis of the second light beam incident on the light homogenizer, the first optical axis and the second optical axis defines a first plane, a third optical axis of the third light beam passing through the light homogenizer is parallel to the second optical axis, and a plane orthogonal to the third optical axis defines a second plane, the second plane having: a horizontal axis at which the first plane intersects with the second plane; and a vertical axis orthogonal to the horizontal axis along the second plane, the horizontal axis intersects with the vertical axis at a first center that is a center of a cross-section of the light homogenizer on the second plane. The light homogenizer and the color wheel are arranged to satisfy a conditional expression:

$$0 \leq \theta 2 \leq \theta 1,$$

where θ1 is an angle between the vertical axis and a line from the first center to a second center of the color wheel, at which the first center is a center of a coordination system, and θ2 is an angle between the vertical axis and a line extending from the first center along a longitudinal direction of the cross-section of the light homogenizer.

In a twenty-seventh aspect, in the illumination device according to any one of the seventeenth aspect to the twenty-sixth aspect, at least one of the first light source or the second light source includes one or more of light profile adjuster.

In a twenty-eighth aspect, in the illumination device according to any one of the seventeenth aspect to the twenty-seventh aspect, the first light source includes: a first light emitting element to emit the first light beam; and a first wavelength converter to convert the first light beam, and the second light source includes: a second light emitting element to emit the second light beam; and a second wavelength converter to convert the second light beam, a first optical axis of the first light beam is orthogonal to a first perpendicular line perpendicular to a first converting surface of the first wavelength converter, a second optical axis of the second light beam is orthogonal to a second perpendicular line perpendicular to a second converting surface of the second wavelength converter, the first optical axis and the first perpendicular line forms a third plane; and the second optical axis and the second perpendicular line forms a fourth plane, and the third plane are parallel to the fourth plane and at different positions different in a direction perpendicular to the third plane and the fourth plane.

In a twenty-nineth aspect, in the illumination device according to any one of the seventeenth aspect to the twenty-eighth aspect, the first light source and the second light source are arranged at positions at which profiles of condensed light spots at an entrance of the light homogenizer are different.

In a thirtieth aspect, in the illumination device according to any one of the seventeenth aspect to the twenty-eighth aspect, the light homogenizer has an entrance having a rectangular cross-sectional shape having vertical sides and horizontal sides, the first light beam forms a first condensed light spot at the entrance of the light homogenizer; the second light beam forms a second condensed light spot at the entrance of the light homogenizer; the first condensed light spot having a first profile having a substantially rectangular shape having first vertical sides and first horizontal sides, the first vertical sides and the first horizontal sides of which are respectively inclined with the vertical sides and horizontal sides of the entrance of the light homogenizer, the second condensed light spot having a second profile having a substantially rectangular shape having second vertical sides and second horizontal sides, the second vertical sides and the second horizontal sides of which are respectively inclined with the vertical sides and horizontal sides of the entrance of the light homogenizer.

In a thirty-first aspect, in the illumination device according to the thirtieth aspect, a first center position of the first profile is offset from a second center position of the second profile in a direction parallel to the first direction within a range of the entrance of the light homogenizer.

In a thirty-second aspect, an illumination device includes: a first light source to emit a first light beam having a first intensity distribution in a first direction; a second light source to emit a second light beam having a second intensity distribution in a second direction different from the first direction; a light combiner to combine the first light beam emitted from the first light source and the second light beam emitted from the second light source; and a light homogenizer separated from the light combiner and to homogenize the first intensity distribution of the first light beam and the second intensity distribution of the second light beam to generate and emit a third light beam. The first light beam is reflected by the light combiner and is incident on the light homogenizer in the second direction; and the second light beam is incident on the light homogenizer in the second direction without passing through the light combiner.

In a thirty-third aspect, a projector includes: the illumination device according to any one of the seventeenth aspect to the thirty-second aspect, and a projection lens.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An illumination device, comprising:
- a first light source to emit a first light beam having a first intensity distribution in a first direction; and
- a second light source to emit a second light beam having a second intensity distribution in a second direction different from the first direction, wherein
- the first light source includes:
  - a first light emitting element to emit the first light beam; and
  - a first wavelength converter to convert the first light beam,
- the second light source includes:
  - a second light emitting element to emit the second light beam; and
  - a second wavelength converter to convert the second light beam,
- a first optical axis of the first light beam is orthogonal to a first perpendicular line perpendicular to a first converting surface of the first wavelength converter,
- a second optical axis of the second light beam is orthogonal to a second perpendicular line perpendicular to a second converting surface of the second wavelength converter,
- the first optical axis and the first perpendicular line forms a first plane,
- the second optical axis and the second perpendicular line forms a second plane, and
- the first plane is parallel to and spatially offset from the second plane.

2. The illumination device according to claim 1, further comprising:
- a light combiner to combine the first light beam and the second light beam; and
- a light homogenizer separated from the light combiner, the light homogenizer to generate and emit a third light beam by homogenizing the first intensity distribution of the first light beam and the second intensity distribution of the second light beam, wherein
- the first light beam is reflected by the light combiner and is incident on the light homogenizer in the second direction, and
- the second light beam is incident on the light homogenizer in the second direction without passing through the light combiner.

3. The illumination device according to claim 2, wherein the light homogenizer includes a rod integrator.

4. The illumination device according to claim 2, wherein the light homogenizer includes a light tunnel.

5. The illumination device according to claim 2, wherein a first spectra of the first light beam is different from a second spectra of the second light beam combined with the first light beam by the light combiner.

6. The illumination device according to claim 2, wherein
- the light combiner is a polygonal prism, and
- at least one of an incident surface or an exit surface of the polygonal prism is a diffuse surface.

7. The illumination device according to claim 2, further comprising a color wheel between the light combiner and the light homogenizer.

8. The illumination device according to claim 7, wherein
- the first optical axis is arranged at 90 degrees with respect to the second optical axis,
- the first optical axis and the second optical axis define a third plane,
- a third optical axis of the third light beam passes through the light homogenizer is parallel to the second optical axis, and a plane orthogonal to the third optical axis defines a fourth plane,
- the second plane has:
  - a horizontal axis at which the third plane intersects the fourth plane; and
  - a vertical axis orthogonal to the horizontal axis along the fourth plane,
- the horizontal axis intersects with the vertical axis at a first center that is a center of a cross-section of the light homogenizer on the fourth plane, and
- the light homogenizer and the color wheel are arranged to satisfy a conditional expression:

$$0 \le 02 \le 01,$$

- where θ1 is an angle between the vertical axis and a line from the first center to a second center of the color wheel, at which the first center is a center of a coordination system, and
- θ2 is an angle between the vertical axis and a line extending from the first center along a longitudinal direction of the cross-section of the light homogenizer.

9. The illumination device according to claim 2, wherein the first light source and the second light source are arranged at positions at which profiles of condensed light spots at an entrance of the light homogenizer are different.

10. The illumination device according to claim 1, wherein the first optical axis is arranged at 90 degrees with respect to the second optical axis.

11. The illumination device according to claim 1, wherein at least one of the first light source or the second light source includes an excitation light source and a wavelength converter.

12. The illumination device according to claim 1, wherein at least one of the first light source or the second light source includes multiple optical elements.

13. The illumination device according to claim 1, wherein at least one of the first light source or the second light source includes one or more of light profile adjuster.

14. A projector, comprising:

the illumination device according to claim 1; and a projection lens.

15. A illumination device, comprising:

a first light source to emit a first light beam having a first intensity distribution in a first direction;

a second light source to emit a second light beam having a second intensity distribution in a second direction different from the first direction;

a light combiner to combine the first light beam and the second light beam; and a light homogenizer separated from the light combiner, the light homogenizer to generate and emit a third light beam by homogenizing the first intensity distribution of the first light beam and the second intensity distribution of the second light beam, wherein the first light beam is reflected by the light combiner and is incident on the light homogenizer in the second direction, the second light beam is incident on the light homogenizer in the second direction without passing through the light combiner, the light homogenizer has an entrance having a rectangular cross-sectional shape having vertical sides and horizontal sides, the first light beam forms a first condensed light spot at the entrance of the light homogenizer, the second light beam forms a second condensed light spot at the entrance of the light homogenizer, the first condensed light spot has a first profile having a substantially rectangular shape having first vertical sides and first horizontal sides, the first vertical sides and the first horizontal sides of which are respectively inclined with the vertical sides and horizontal sides of the entrance of the light homogenizer, and the second condensed light spot has a second profile having a substantially rectangular shape having second vertical sides and second horizontal sides, the second vertical sides and the second horizontal sides of which are respectively inclined with the vertical sides and horizontal sides of the entrance of the light homogenizer.

16. The illumination device according to claim 15, wherein a first center position of the first profile is offset from a second center position of the second profile in a direction parallel to the first direction within a range of the entrance of the light homogenizer.

17. A projector, comprising:

the illumination device according to claim 15; and a projection lens.

18. An illumination device, comprising:

a first light source to emit a first light beam having a first intensity distribution in a first direction;

a second light source to emit a second light beam having a second intensity distribution in a second direction different from the first direction;

a light combiner to combine the first light beam emitted from the first light source and the second light beam emitted from the second light source; and a light homogenizer separated from the light combiner, the light homogenizer to generate and emit a third light beam by homogenizing the first intensity distribution of the first light beam and the second intensity distribution of the second light beam, wherein the light homogenizer includes an entrance having a rectangular cross-sectional shape having vertical sides and horizontal sides, the first light beam forms a first condensed light spot at the entrance of the light homogenizer, the second light beam forms a second condensed light spot at the entrance of the light homogenizer, the first condensed light spot has a first profile having a substantially rectangular shape having first vertical sides and first horizontal sides, the first vertical sides and the first horizontal sides of which are respectively inclined with the vertical sides and horizontal sides of the entrance of the light homogenizer, and the second condensed light spot has a second profile having a substantially rectangular shape having second vertical sides and second horizontal sides, the second vertical sides and the second horizontal sides of which are respectively inclined with the vertical sides and horizontal sides of the entrance of the light homogenizer.

19. A projector, comprising:

the illumination device according to claim 18; and a projection lens.

* * * * *